(12) United States Patent
Sabetto

(10) Patent No.: US 11,711,304 B2
(45) Date of Patent: Jul. 25, 2023

(54) PACKET SWITCH AND PACKET PERIOD DETERMINATION METHOD

(71) Applicant: FUJITSU LIMITED, Kawasaki (JP)

(72) Inventor: Yoshikazu Sabetto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/234,846

(22) Filed: Apr. 20, 2021

(65) Prior Publication Data

US 2022/0021619 A1 Jan. 20, 2022

(30) Foreign Application Priority Data

Jul. 17, 2020 (JP) ................ 2020-123031

(51) Int. Cl.
*H04L 47/24* (2022.01)
*H04W 28/02* (2009.01)

(52) U.S. Cl.
CPC ......... *H04L 47/24* (2013.01); *H04W 28/0289* (2013.01)

(58) Field of Classification Search
CPC ............. H04L 47/24; H04L 12/40156; H04W 28/0289
See application file for complete search history.

(56) References Cited

U.S. PATENT DOCUMENTS

| 2019/0158411 | A1* | 5/2019 | Nishimura | ............ H04L 43/022 |
| 2019/0213334 | A1* | 7/2019 | Sakamoto | ............. H04B 10/27 |
| 2019/0386913 | A1* | 12/2019 | Wei | ..................... H04L 49/1515 |
| 2022/0116825 | A1* | 4/2022 | Shibata | ............ H04W 28/0967 |

FOREIGN PATENT DOCUMENTS

| JP | 2000-209242 A | 7/2000 |
| JP | 2003-249978 A | 9/2003 |

* cited by examiner

Primary Examiner — Khaled M Kassim
Assistant Examiner — Najeeb Ansari
(74) Attorney, Agent, or Firm — Fujitsu Patent Center

(57) ABSTRACT

A packet switch that determines a time slot for closing transmission of low-priority packets based on a determination result of periods of high-priority packets having periodicity, the packet switch includes: a memory; and a processor coupled to the memory and configured to: determine, for respective input ports, the periods of the input high-priority packets; and determine a setting period of a gate control list in which the time slot for closing is set, based on the determined periods of the high-priority packets.

8 Claims, 19 Drawing Sheets

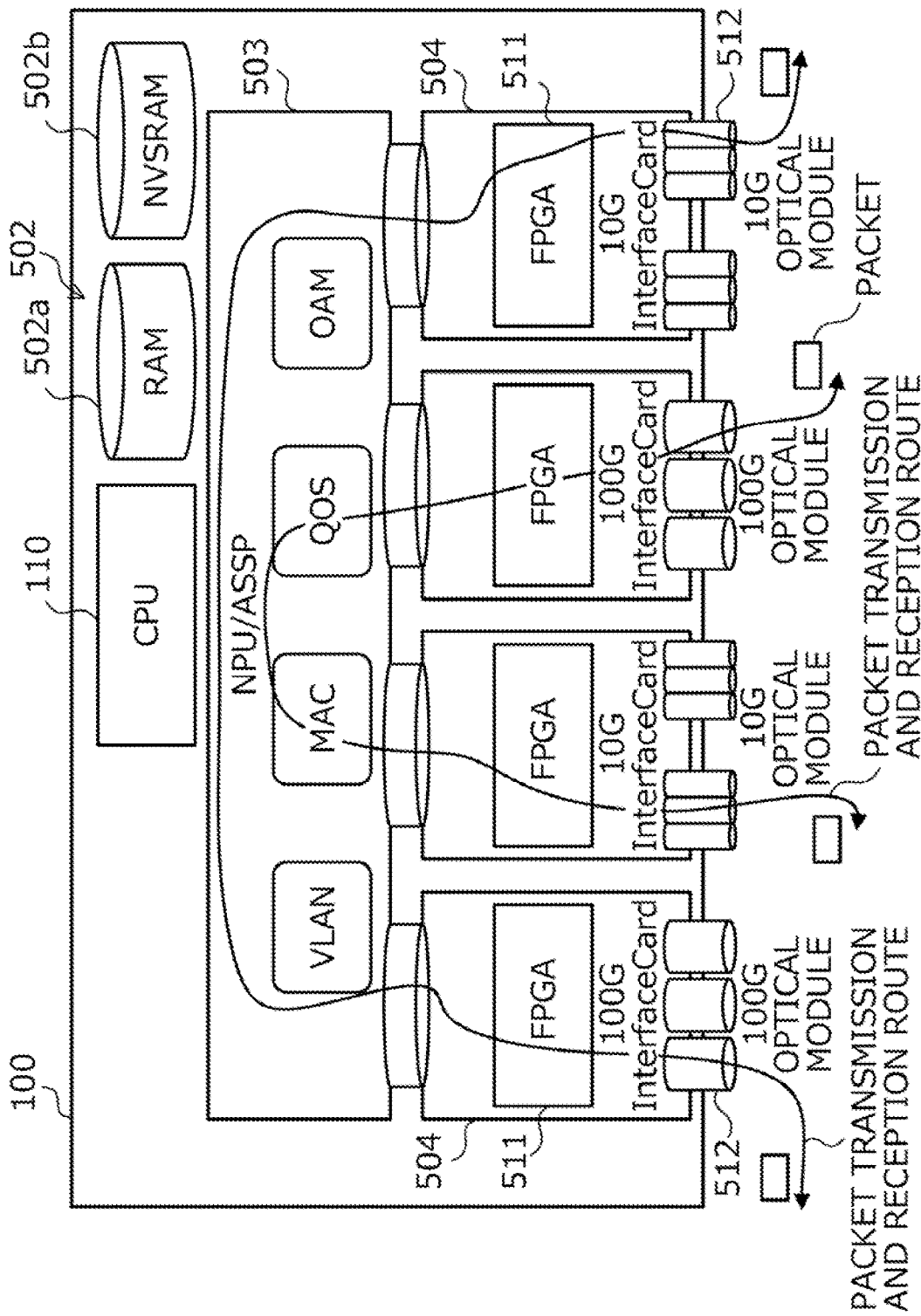

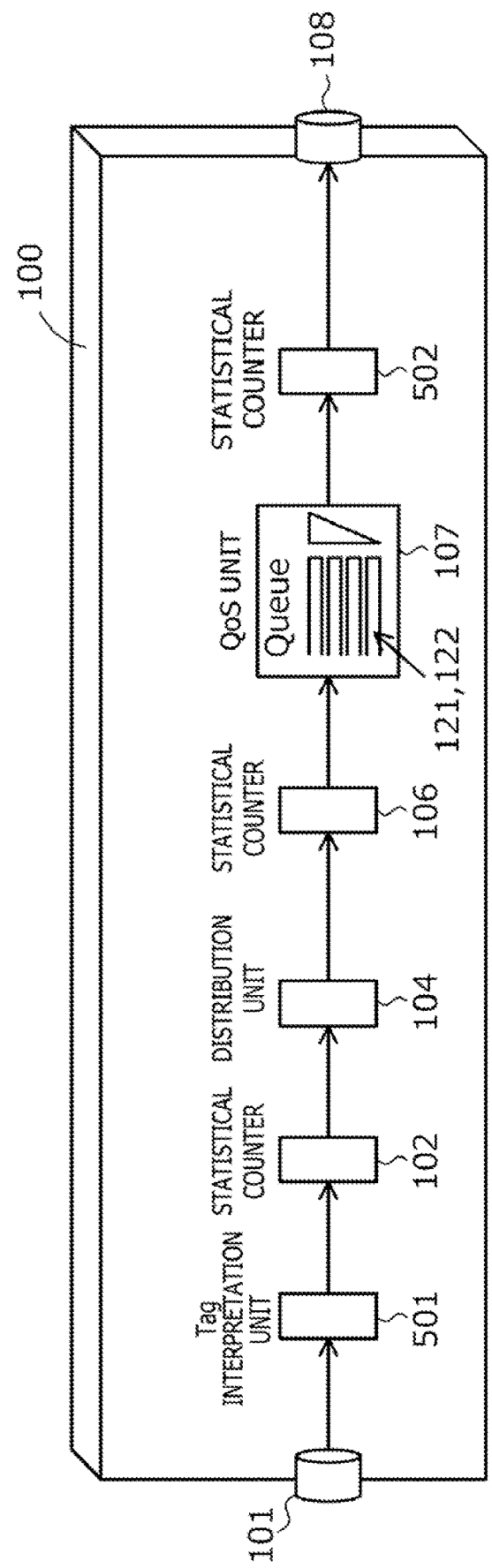

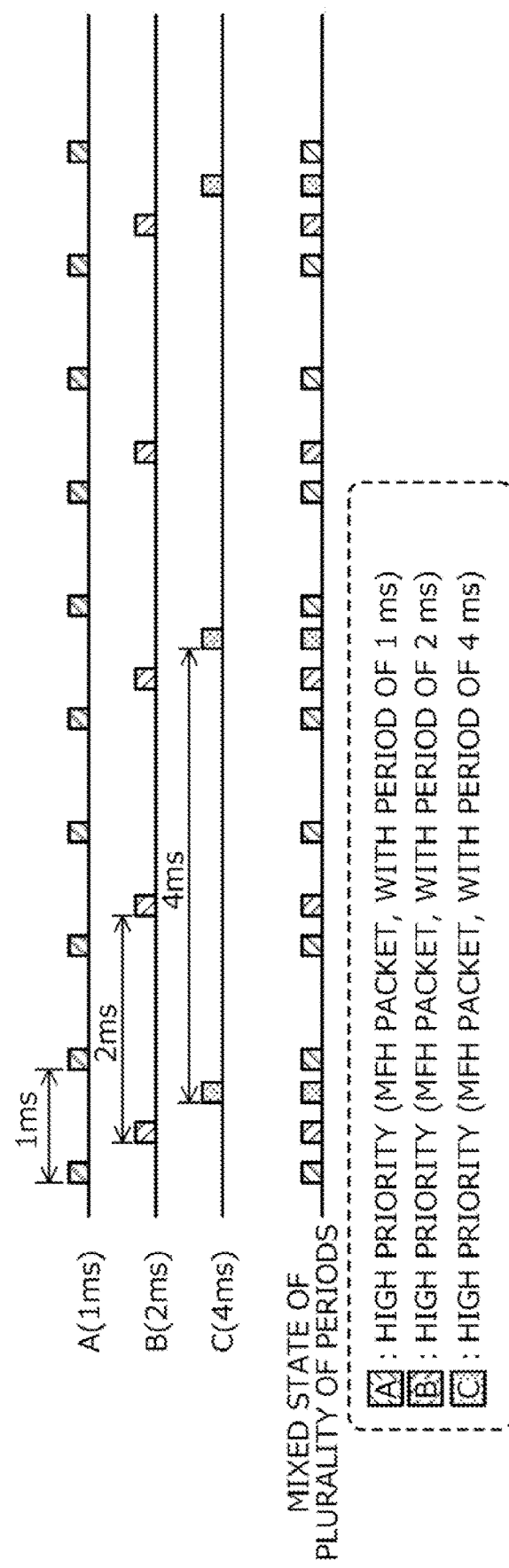

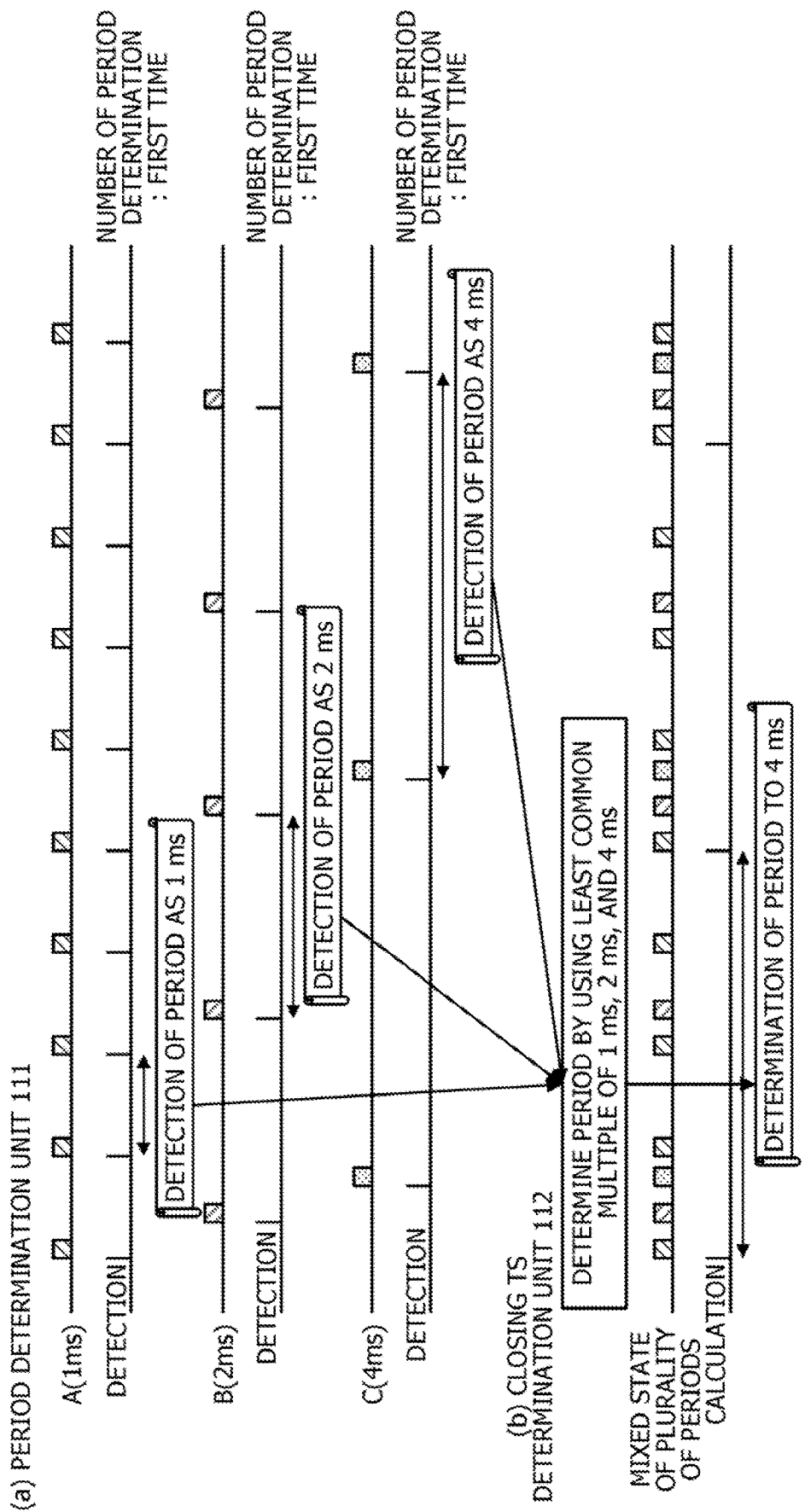

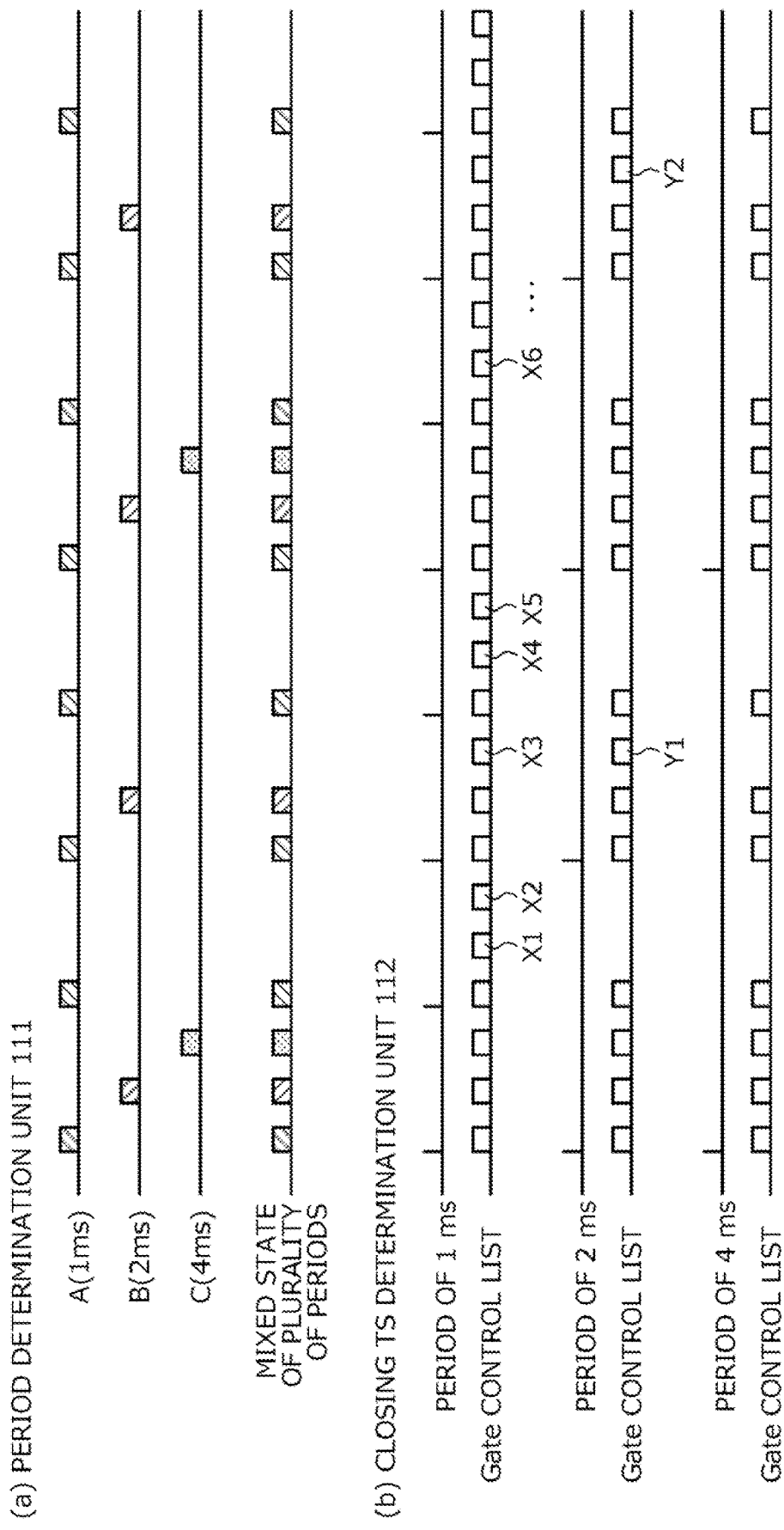

PACKET SWITCH AND PACKET PERIOD DETERMINATION METHOD

CROSS-REFERENCE TO RELATED APPLICATION

This application is based upon and claims the benefit of priority of the prior Japanese Patent Application No. 2020-123031, filed on Jul. 17, 2020, the entire contents of which are incorporated herein by reference.

FIELD

The embodiments discussed herein are related to a packet switch and a packet period determination method.

BACKGROUND

In a next-generation fifth-generation mobile communication system (5G), not only a terminal of the related art such as a smartphone but also various devices such as an automobile, an industrial machine, and a smart meter are coupled. In order to deal with applications such as automatic driving of automobiles, virtual reality (VR)/augmented reality (AR), and remote medical care, a super delay of 1 milliseconds (msec, ms) is demanded in a radio section in 5G. In 5G, the separation of base station functions into a base band unit (BBU) and a remote radio head (RRH), and the division of base station functions to reduce the amount of transmission are being reviewed for a small cell implementation. In order to improve network efficiency, migration to a packet network in which wired and wireless (MFH and MBH) are integrated has been considered. MFH is an abbreviation for mobile front haul, and MBH is an abbreviation for mobile back haul.

Related art is disclosed in Japanese Laid-open Patent Publication No. 2003-249978 and Japanese Laid-open Patent Publication No. 2000-209242.

SUMMARY

According to an aspect of the embodiments, a packet switch that determines a time slot for closing transmission of low-priority packets based on a determination result of periods of high-priority packets having periodicity, the packet switch includes: a memory; and a processor coupled to the memory and configured to: determine, for respective input ports, the periods of the input high-priority packets; and determine a setting period of a gate control list in which the time slot for closing is set, based on the determined periods of the high-priority packets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A is a diagram illustrating a hardware configuration example of a packet switch;

FIG. 5B is a functional block diagram of a packet switch;

FIG. 6A is a timing chart for describing an example of inputting packets having different periods;

FIG. 6C is a timing chart for describing period determination of a packet switch corresponding to FIG. 6A;

FIG. 7 is an explanatory diagram using a least common multiple determining a period of a closing TS;

DESCRIPTION OF EMBODIMENTS

Figure 1:
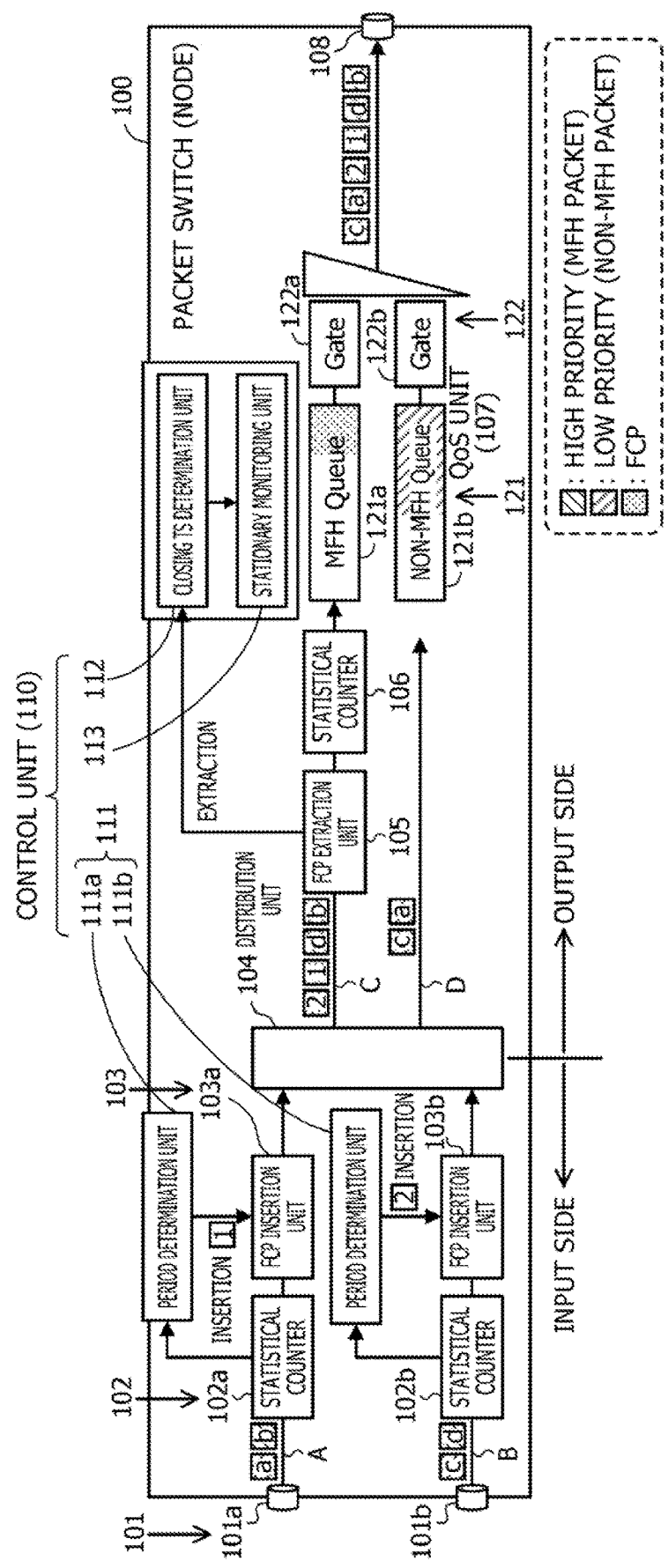
FIG. 1 is an explanatory diagram illustrating an example of a packet switch according to Embodiment 1.

In such an integrated network, traffic having various characteristics and requirements flows over a same network. For example, MFH has a characteristic of being more sensitive to delay than other traffic due to constraints such as 5G requirements and re-transmission control rules. For example, since output delay occurs because an MFH packet from an MFH line conflicts with an MBH packet from an MBH line, priority control processing for suppressing the output delay is known. In the priority control processing, since a subsequent high-priority packet overtakes the queued low-priority packet and is read preferentially, the output delay of the high-priority MFH packet may be suppressed.

In the priority control processing, when a high-priority packet arrives during reading of a low-priority packet, a reading operation of the high-priority packet is stopped until reading and outputting of the low-priority packet being read is completed, and a wait for one packet occurs. In the MFH line, output delay of 100 microseconds (μsec, μs) or less is demanded between the RRH and the BBU, therefore, in a case of a multistage node configuration, such output delay for the one packet may not be ignored.

Institute of Electrical and Electronics Engineers (IEEE) 802.1 time-sensitive networking (TSN), which may realize low latency in a packet network, is attracting attention. In IEEE 802.1 TSN, for low latency of the MFH, there are a technique related to collecting mobile fronthaul network requirements, a technique related to gate control of other TSN standards regarding which traffic is captured, and a queuing related technique for reducing delay of a packet switch. Based on a time aware shaper (TAS) technology, there is an intelligent TAS (iTAS) technology in which a switch (node) autonomously learns a period or the like of MFH traffic and adjusts a timing of gate control, thereby achieving low latency.

A related art related to packet control in a node will be described. For example, a technique is disclosed in which it is determined whether or not received data transmitted from a previous node is a control packet, and the received data of the control packet is held, so that a normal operation may be restored at the time of an abnormal operation. A technique for suppressing packet collision between nodes by adjusting a transmission waiting time based on the number of times a congestion control packet is received is disclosed.

In the related art, when MFH frames having a plurality of periods are input to a node from a plurality of points, it takes time to determine a period of the MFH traffic.

In an iTAS, a timing of the gate control is controlled by using the following phases 1. to 3. 1. "Period determination phase" in which a packet flow rate in a device is learned and a period is determined, 2. "Closing TS determination phase" in which a time slot (TS) for closing is determined from a traffic pattern in a period and a gate control list (GCL) is generated. 3. "Stationary monitoring phase" in which gate control is performed in accordance with the GCL.

The phases 1 and 2 above correspond to learning states based on the arrived packet, and the phase 3 controls a gate based on the GCL created in the phase 2 in an actual operation state of the device. A packet switch of the related art performs processing of the above-described 1. "period determination phase" to 3. "stationary monitoring phase" on MFH packets obtained by a distribution unit distributing high-priority MFH packets and low-priority non-MFH packets by different queues and gates.

In the iTAS, for a setting state of the GCL, all high-priority packets are set to open and the gate control for low-priority packets is set and modified from open to closed according to the traffic pattern of high-priority packets.

There are the following methods a. and b. for determining a period in the 1. period determination phase. a. Method (burst edge method) of determining, as a start of a period, a signal after no signal continues for a threshold time or longer after input of a burst signal, and b. Method (new burst edge method) of checking whether or not an interval between bursts is periodic by expanding bursts that are sequentially compared from adjacent bursts In the method a., when the input burst signal has a single period, a detection accuracy is high and a detection time is short. However, in a case where there are a plurality of bursts in one period, it is demanded to set to a value exceeding a threshold value only one time in one period. For example, the period is erroneously detected unless the threshold value is appropriately set in accordance with the burst signal.

In the method b., it is checked whether or not the interval from the bursts adjacent to both the front and rear edges of the burst is periodic, and a longer period is selected from among the periods respectively obtained for the front and rear edges. Thus, the period detection accuracy when a plurality of periods are mixed is higher than that in the method a. However, it takes a long time to detect the period because it is desirable to repeatedly check the adjacent bursts for one period before the period is confirmed.

In one aspect, a period of an input signal may be accurately determined in a short time. Hereinafter, embodiments of a packet switch and a packet period determination method according to the present disclosure will be described in detail with reference to the drawings.

Embodiment 1

(Overview of Packet Period Determination Method)

FIG. 1 is an explanatory diagram illustrating an example of a packet switch according to Embodiment 1. A packet switch 100 according to Embodiment 1 performs statistical learning on periods and patterns of received high-priority packets and determines a time slot (TS) for closing passage of low-priority packets. The packet switch 100 monitors the periodically arriving high-priority packets, and determines the TS for closing the passage of the low-priority packets in response to the reception of the high-priority packets.

In the following description, it is assumed that a high-priority packet is a mobile front haul (MFH) packet and a low-priority packet is a non-MFH packet.

As illustrated in FIG. 1, the packet switch 100 includes a plurality of input ports 101, statistical counters 102, FCP insertion units 103, a distribution unit 104, an FCP extraction unit 105, a statistical counter 106, a QoS unit 107, and an output port 108 along a flow of input and output of a received signal. FCP is an abbreviation for a frequency control packet, and in Embodiment 1, the FCP is a control packet for transferring determined period information to a subsequent stage (FCP extraction unit 105) in a device.

A control unit 110 of the packet switch 100 has functions of a period determination unit 111, a closing TS determination unit 112, and a stationary monitoring unit 113, and executes and processes each of these functions.

The period determination unit 111 executes processing related to 1. "period determination phase". The period determination unit 111 collects the amount of MFHs arriving at the packet switch 100 at regular time intervals, and detects periodicity of the MFHs. The period determination unit 111 performs period detection a plurality of times and determines a cycle length of a GCL 300 (refer to FIG. 3) based on a calculated average period.

The closing TS determination unit 112 executes processing related to 2. "closing TS determination phase". The closing TS determination unit 112 grasps a burst shape by observing a head TS of the burst of the MFH packet and a length thereof for a plurality of periods, and outputs the GCL 300 in which a TS corresponding to a non-MFH is changed to close (C).

In the operation state of the packet switch 100, the stationary monitoring unit 113 executes processing related to 3. "stationary monitoring phase", opens and closes gates of the MFH packet and the non-MFH packet, and controls respective output states of the MFH packet and the non-MFH packet.

The MFH packet and the non-MFH packet are input to the input ports 101. In the example illustrated in FIG. 1, the number of the input ports is two. For example, the MFH packet input to one input port 101a is, for example, an MFH packet from one RRH. An MFH packet from the other RRH is input to the other input port 101b. Unspecified non-MFH packets are input to these input ports 101a and 101b.

A period of the MFH packet output from the RRH is managed by a BBU. For example, a period of the MFH packet output by an RRH that performs "4G" communication is fixed to, for example, 1 msec. A period of the MFH packet output by an RRH that performs "5G" communication is fixed to, for example, any of 250 μsec, 500 μsec, and 1 msec. Therefore, the period of the MFH packet input to one input port 101 of the packet switch 100 is a predetermined single period.

A plurality of the statistical counters 102 are arranged corresponding to the plurality of input ports 101, detect signal lengths, count values, and the like of burst signals of the MFH packets and the non-MFH packets input to the input ports 101, and output the detected information to the period determination unit 111.

A plurality of the period determination units 111 are arranged corresponding to the plurality of input ports 101, and perform period determination of the MFH packets. The period information determined by the period determination units 111 is inserted into a transmission path in the device coupled to the input ports 101 as the FCP by the FCP insertion unit 103.

A plurality of the FCP insertion units 103 are provided corresponding to the plurality of input ports 101. The FCP insertion units 103 store period determination results by the period determination units 111, for example, period determination results for the MFH packets input to the input ports 101 in which the period determination units 111 are arranged, in the FCP, and output the period determination results to the transmission path in the device.

In the example of FIG. 1, a period determination unit 111a performs period determination of the MFH packet input to the input port 101a based on an output of a statistical counter 102a. The period determination unit 111a inserts the determined period information as the FCP into a transmission path A in a device coupled to the input port 101a by an FCP insertion unit 103a. The period determination unit 111b performs period determination for the MFH packet input to the input port 101b based on an output of a statistical counter 102b. The period determination unit 111b inserts the determined period information as the FCP into a transmission path B in a device coupled to the input port 101b by an FCP insertion unit 103b.

The distribution unit 104 distributes output paths according to the priority for the packets respectively input from the plurality of input ports 101 (101a and 101b). In the example of FIG. 1, high-priority MFH packets are output to a transmission path C side, and non-MFH packets are output to a transmission path D side. The distribution unit 104 outputs all the FCPs flowing over the transmission paths A and B to the transmission path C side.

The FCP extraction unit 105 extracts the FCPs among the MFH packets and the FCPs flowing over the transmission path C, and outputs the FCPs to the closing TS determination unit 112.

As described above, in the packet switch 100 according to Embodiment 1, the FCP insertion units 103 and the period determination units 111 are arranged in a previous stage (input side) of the distribution unit 104, centering on the distribution unit 104 that distributes the high-priority MFH packets and the low-priority non-MFH packets. The FCP extraction unit 105, the closing TS determination unit 112, and the stationary monitoring unit 113 are arranged at a subsequent stage (output side) of the distribution unit 104. In the packet switch of the related art, the period determination units 111, the closing TS determination unit 112, and the stationary monitoring unit 113 are arranged at the subsequent stage (output side) of the distribution unit 104.

The statistical counter 106 detects the count values of the MFH packets over the transmission path C. The MFH packets and the FCPs are output to the QoS unit 107. In Embodiment 1, the statistical counter 106 may be omitted.

The QoS unit 107 includes queues 121 and gates 122. The QoS unit 107 controls the queues 121 and the gates 122 based on the control of the control unit 110 (stationary monitoring unit 113). The MFH packets and the FCPs are stored in a queue 121a provided over the transmission path C, and the non-MFH packets are stored in a queue 121b provided over the transmission path D. Under the control of the control unit 110 (stationary monitoring unit 113), the gates 122 (122a and 122b) open and close the gates for the MFH packets and the non-MFH packets, and output the respective MFH packets and the non-MFH packets from one output port 108.

The period determination for each of the input ports 101 will be described based on the description of FIG. 1. It is assumed that a low-priority non-MFH packet "a" and a high-priority MFH packet "b" are input to the input port 101a. It is assumed that a low-priority non-MFH packet "c" and a high-priority MFH packet "d" are input to the input port 101b.

The period determination unit 111a performs period determination for the MFH packet input to the input port 101a, and inserts the determined period information into the transmission path A in the device coupled to the input port 101a as the FCP by the FCP insertion unit 103a. The period determination unit 111b performs period determination for the MFH packet input to the input port 101b, and inserts the determined period information into the transmission path B in the device coupled to the input port 101b as the FCP by the FCP insertion unit 103b.

The distribution unit 104 outputs the high-priority MFH packets "b" and "d" to the transmission path C side. The distribution unit 104 outputs an FCP "1" flowing over the transmission path A to the transmission path C side, and also outputs an FCP "2" flowing over the transmission path B to the transmission path C side. The distribution unit 104 outputs the low-priority MFH packets "a" and "c" to the transmission path D side.

The MFH packets "b" and "d" and the FCPs "1" and "2" over the transmission path C are stored in the queue 121a of the MFH, and the non-MFH packets "a" and "c" over the transmission path D are stored in the queue 121b of the non-MFH.

The FCP extraction unit 105 extracts the FCPs "1" and "2" flowing over the transmission path C. The control unit 110 (closing TS determination unit 112) determines a closing TS based on the period information included in the FCP. At the time of stationary monitoring during operation, the stationary monitoring unit 113 executes an opening and closing operation of the gates 122 (122a and 122b) based on the closing TS. For example, the packet switch 100 of the iTAS performs control to keep the gate 122a of the MFH packet normally open and immediately output the MFH packet, but the packet switch 100 of the iTAS performs control to close the gate 122b during an output period of the MFH packet, for the non-MFH packet.

The closing TS determination unit 112 determines the closing TS by using the least common multiple of each period information included in the plurality of FCPs "1" and "2" as the period. For example, in a case where the period of the FCP "1" is 2 msec and the period of the FCP "2" is 3 msec, the least common multiple of these periods, 6 msec, is determined as the closing TS. Thus, even when MFH packets having different periods are respectively input from the plurality of input ports 101a and 101b, it is possible to determine an optimum period as the closing TS in the packet switch 100. Details for determining the closing TS will be described later.

In the existing packet switch 100, the period determination units 111 are arranged at the subsequent stage of the distribution unit 104. In the example of FIG. 1, the period determination units 111 are arranged on the same side as the closing TS determination unit 112. In this case, the MFH packets input from the plurality of input ports 101 are mixed in one period determination unit 111. When the MFH packets have a plurality of different periods, inconvenience will occur in any of the cases where the burst edge methods of a. and b. described in the related art are used.

On the other hand, the packet switch 100 having the above-described configuration according to Embodiment 1 includes the respective period determination units 111 for the corresponding input ports 101, and determines the period of packets (MFH packets) normally having a single period, input to the input port 101. Thus, the period determination may be easily and simply performed with predetermined accuracy without performing highly accurate period determination processing. For example, the period determination unit 111 may easily determine the period in a short time by using the a. burst edge method described above.

(Overview of Packet Switch)

Figure 2:
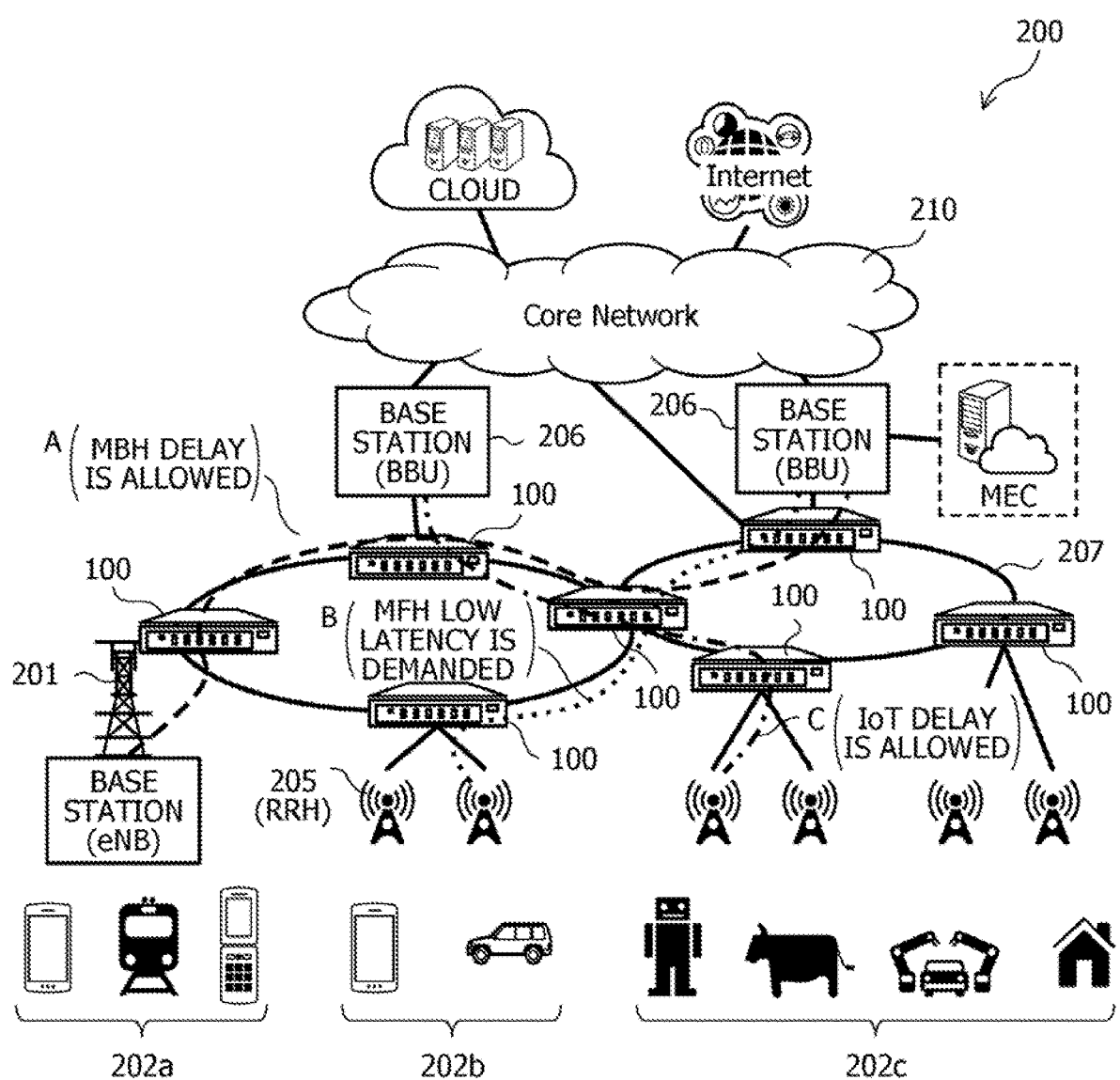
FIG. 2 is a diagram illustrating a configuration example of a communication system including a packet switch.

FIG. 2 is a diagram illustrating a configuration example of a communication system including a packet switch. A communication system 200 illustrated in FIG. 2 has an MBH line A where a delay is allowed and an MFH line B where low latency is demanded. The MBH line A is a line that couples between a plurality of base stations (eNB: evolved Node B) 201. In addition, a terminal 202c or the like of the IoT is coupled to a BBU 206 via a line C where a delay is allowed.

The base station 201 is coupled wirelessly to a radio terminal 202a through a radio antenna. The MFH line B is a line coupling between a remote radio head (RRH) 205 and the base band unit (BBU) 206. The RRH 205 is coupled wirelessly to a radio terminal 202b. The MFH line B employs a Common Public Radio Interface (CPRI) method in which a radio signal is transmitted between the RRH 205 and the BBU 206 as the MFH packet of a layer 2 (L2) frame. The MFH packet is strongly demanded to suppress output delay compared to the MBH packet.

The BBU 206 has a radio section scheduling function. The scheduling function is a function for determining various factors such as user data, a coding rate, and a modulation method to be transmitted in one sub-frame. For example, the BBU 206 divides user data transmitted from a core network 210 side into L2 frames and transmits the MFH packets to the RRH 205. For example, the BBU 206 transmits the MFH packets to the RRH 205 at sub-frame intervals, for example, every 1 msec. The RRH 205 divides the user data of the received radio signal into the L2 frames, and transmits the MFH packets to the BBU 206.

A plurality of the packet switches 100 described above are arranged over a backbone line 207 coupling between an eNB 201, the RRH 205, and the BBU 206. The packet switch 100 is a line for transmitting the MBH packets from the MBH line A and the MFH packets from the MFH line B. The packet switch 100 transmits various packets other than the MBH packets and the MFH packets. The packet switch 100 adopts a time aware shaper (TAS) method of the IEEE 802.1 Qbv and outputs the MFH packets as the high-priority packets.

Figure 3:
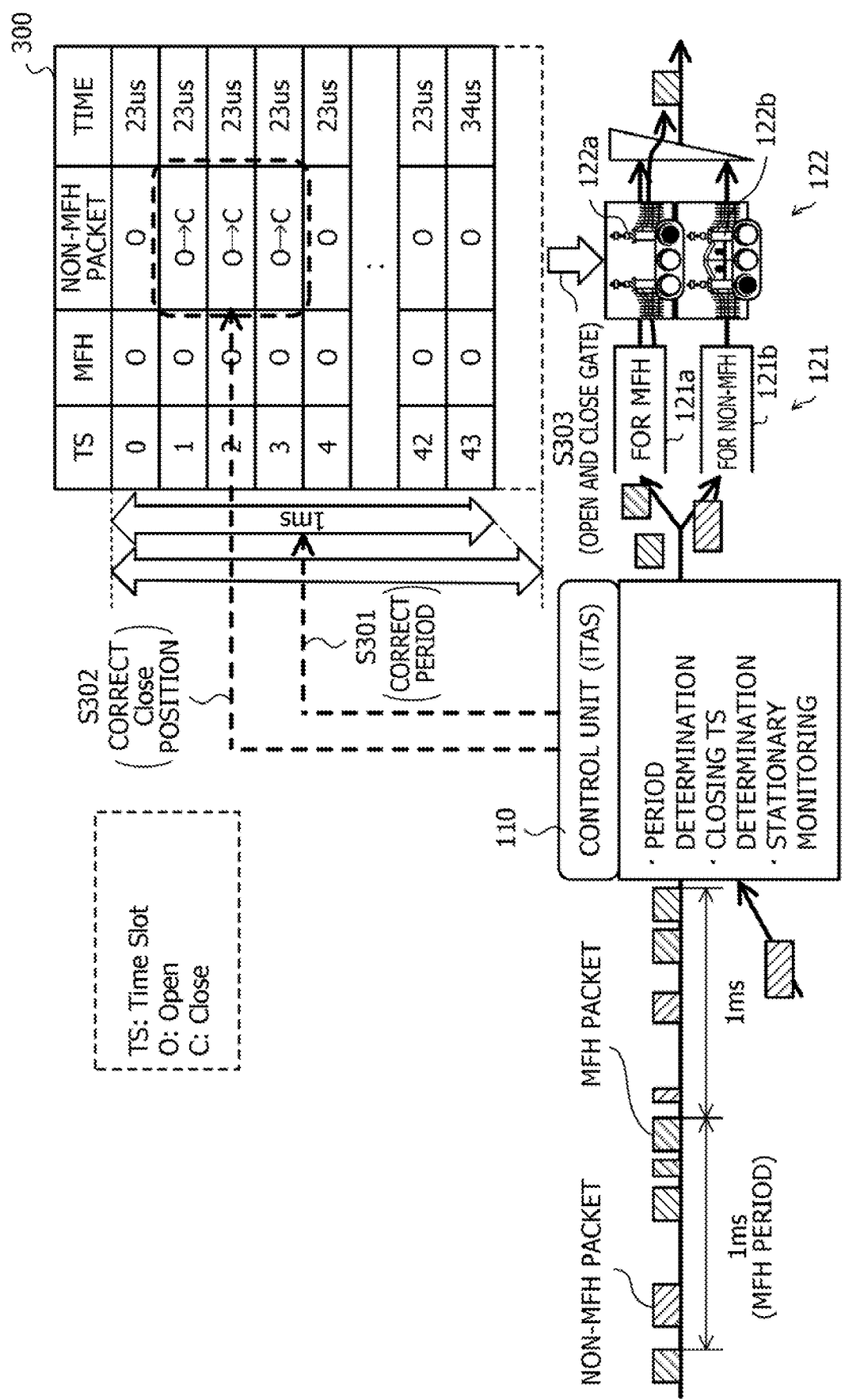
FIG. 3 is a diagram for describing gate control of a packet switch.

FIG. 3 is a diagram for describing gate control of the packet switch. The packet switch 100 performs the gate control based on settings of the gate control list (GCL) 300. The MFH packets and the non-MFH packets arrive at the packet switch 100 in an MFH period (for example, 1 msec).

The control unit (CPU) 110 of the packet switch 100 controls the timing of the gate control by using each phase of the following 1. to 3. as packet control of the iTAS. 1. "Period determination phase" in which a packet flow rate in a device is learned and a period is determined. 2. "Closing TS determination phase" in which a time slot (TS) for closing is determined from a traffic pattern in a period and a gate control list (GCL) is generated. 3. "Stationary monitoring phase" in which gate control is performed in accordance with the GCL.

In the 1. "period determination phase", the control unit 110 collects the arrival amount of traffic of the MFH packets demanding low latency every TS time, and detects the period of the MFHs. Examples of the detection method include a method (above-described a. burst edge method or the like) of estimating a period start based on a rising position from 0 to positive, a folding analysis method using traffic autocorrelation, and the like. When the period is detected, the control unit 110 corrects the cycle length of the GCL 300 so that the cycle length matches a detection period (step S301), increases or decreases the number of TS as occasion demands, and corrects 1 TS (period).

The GCL 300 includes open (O) or close (C) setting for the MFH packet and the non-MFH packet for each TS, and the MFH and the non-MFH are all set as open (O) in an initial state. For example, in a case where the period of the MFH is 1 msec and it is determined that the MFH arrives when the TS is 1, 2, and 3, the control unit 110 sets the non-MFH in the GCL 300 when the TS is 1, 2, and 3 as close (C) as illustrated.

In the 2. "closing TS determination phase", when the packet arrival period and the cycle substantially coincide with each other due to the correction in the above-described 1. "period determination phase", a burst packet of the MFH arrives at substantially the same TS every time. In this phase, the control unit 110 grasps the burst shape by observing the head TS of the burst and the length thereof for a plurality of periods, and sets the TS and front and rear margins as close (C) for the non-MFH of the GCL 300 so as to cover the burst.

In the 3. "stationary monitoring phase", when the above-described 2. "closing TS determination phase" is completed, gate control of the iTAS functions, and the MFH traffic starts to flow with low latency. However, the detection period may deviate from the actual transmission period. Therefore, the control unit 110 continues the observation, and when a burst arrival TS (burst start point) starts to deviate forward and backward in a time axis direction of the TS, the control unit 110 detects the deviation and corrects so that the closing TS also follows the deviation (step S302).

In the 3. "stationary monitoring phase", the control unit 110 controls opening and closing of the gate based on the setting of the GCL 300. The control unit 110 stores the packets of the MFH and the non-MFH in the queues 121. The control unit 110 stores the MFH packet in the queue 121a and stores the non-MFH packet in the queue 121b. The control unit 110 performs gate opening and closing control on these MFH and non-MFH packets and outputs the packets (step S303).

The control unit 110 includes gates 122 according to the classes and performs gate control. The control unit 110 performs gate opening and closing control on the MFH packet read from the queue 121a at the gate 122a. The control unit 110 performs gate opening and closing control on the non-MFH packet read from the queue 121b at the gate 122b. For example, the control unit 110 performs gate control to normally keep the gate 122a open for the MFH packet input to the queue 121*a*, and immediately output the MFH packet. On the other hand, the control unit 110 performs gate control to sequentially accumulate the non-MFH packets input to the queue 121*b* in the queue 121*b*, open the gate 122*b* at the open (O) timing set in the GCL 300, and output the non-MFH packets.

Figure 4:
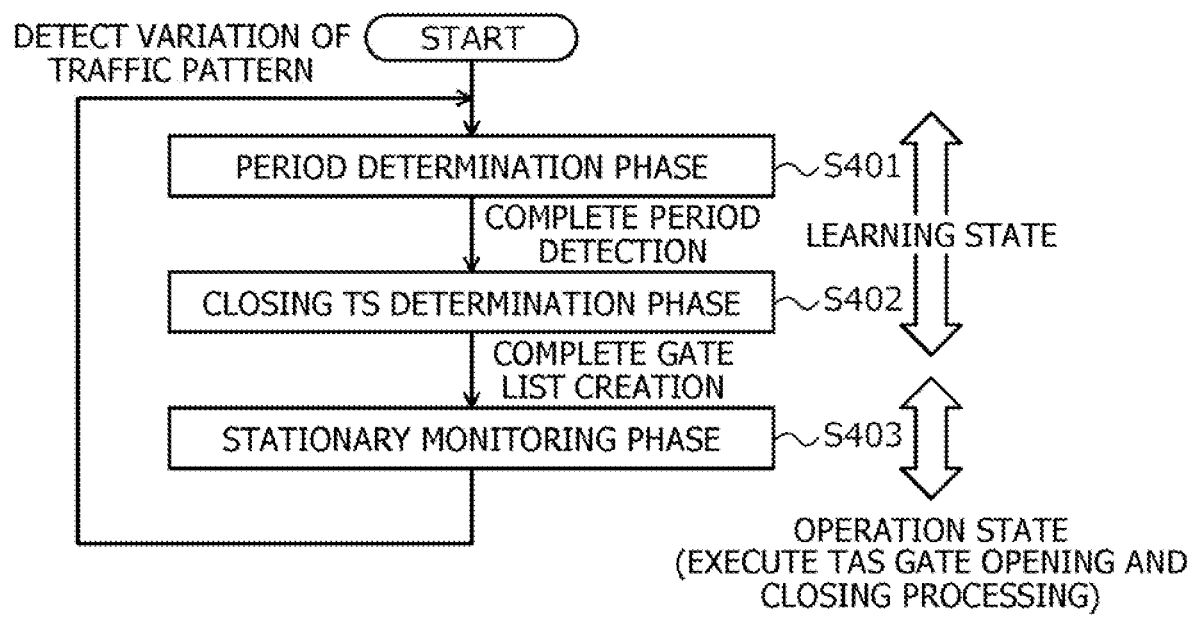
FIG. 4 is a diagram illustrating each phase of gate control of a packet switch.

FIG. 4 is a diagram illustrating each phase of gate control of the packet switch. The control unit 110 of the packet switch 100 enters a learning state for creating the GCL 300 during non-operation, and executes processing of the above-described 1. "period determination phase" (step S401) and processing of the 2. "closing TS determination phase" (step S402).

The period detection for the MFH packets is completed by the processing of the above 1. "period determination phase", and the creation of the GCL 300 is completed by the processing of the 2. "closing TS determination phase". After that, the control unit 110 sets the packet switch 100 as the operation state, executes processing of the 3. "stationary monitoring phase" (step S403), and performs gate opening and closing processing by the iTAS.

In the 3. "stationary monitoring phase", the control unit 110 (refer to FIG. 1) of the packet switch 100 according to Embodiment 1 may correctly detect the periodicity of the high-priority packets by classifying traffic into the MFH of the high-priority packets and other low-priority packets (non-MFH). In a case of low layer split (LLS), since a radio scheduler is on the BBU 206 side, there is a high possibility that meaningful digital data (packet burst) is generated periodically for each sub-frame or symbol in the MFH.

In an initial setting of the GCL 300, the control unit 110 sets both the MFH and the non-MFH as open (O), and also appropriately sets one cycle length. After traffic communication, since the packet switch performs autonomous learning in the 1. "period determination phase" and the 2. "closing TS determination phase" and corrects the cycle length and the closing position, the gate may be closed at a correct timing.

Each node (packet switch 100) over the network autonomously performs the processing of the above 1. and 2., and as a result, timing optimization may be achieved over the entire network without cooperation between the packet switches 100.

In the 3. "stationary monitoring phase", by following the period deviation and continuously correcting the closing TS, an opening and closing timing of the gate (gate 122*b* of the non-MFH) is appropriately maintained normally while keeping the operation state in which the traffic is communicated. This makes it possible to maintain low latency of the MFH packets in the packet switch 100.

In the control unit 110, the processing of the above-described 1. "period determination phase" is more complicated in the processing content and more likely to take the processing time (processing load) than the other processing of the 2. "closing TS determination phase" and the 3. "stationary monitoring phase". In Embodiment 1, the processing related to the 1. "period determination phase" may be easily performed, and the processing time (processing load) is not demanded.

FIG. 5A is a diagram illustrating a hardware configuration example of the packet switch. In FIG. 5A, a housing (shelf) of the packet switch 100 is provided with a central processing unit (CPU) 110, a memory 502, a network processor (NPU/ASSP) 503, a plurality of interface cards 504, and the like. NPU is an abbreviation for a network processing unit, and ASSP is an abbreviation for application specific standard produce.

The CPU 110 supervises overall control of the packet switch 100, and controls and monitors each device of the network processor 503 and the interface cards 504. The CPU 110 executes the control of the iTAS according to Embodiment 1. For example, the CPU 110 executes control processing related to the functions of the period determination unit 111, the closing TS determination unit 112, and the stationary monitoring unit 113 illustrated in FIG. 1.

The memory 502 includes, for example, a volatile memory (random access memory, RAM) 502*a* and a non-volatile memory (non-volatile static random access memory, NVSRAM) 502*b*. A control program of the iTAS is stored in the volatile memory 502*a*, and is read and executed by the CPU 110. The non-volatile memory 502*b* is a database or the like to be accessed when the CPU 110 executes the control of the iTAS, and stores setting information or the like of the packet switch 100.

The network processor 503 and the interface cards 504 have a blade configuration and may be freely attached to and detached from the shelf. The number of interface cards 504 may be increased or decreased in accordance with the number of lines to be accommodated, and an interface card corresponding to a line speed may be mounted.

The network processor 503 executes processing related to the L2 function (VLAN, MAC, QoS, and OAM) of the packet switch 100 by the processing executed by the CPU 110, and controls opening and closing of the gates 122 in accordance with an instruction from the CPU 110. For example, the network processor 503 implements the functions of the FCP insertion unit 103 and the FCP extraction unit 105 illustrated in FIG. 1. VLAN is an abbreviation for virtual local area network, and MAC is an abbreviation for media access control. QoS is an abbreviation for quality of service, and OAM is an abbreviation for operation and maintenance cell.

The interface card 504 includes a field-programmable gate array (FPGA) 511 and an optical module 512. The FPGA 511 controls driving of the optical module 512. The optical module 512 mutually converts an optical signal over a network into an electric signal. The network processor 503 relays packets between the plurality of interface cards 504 corresponding to the packet transmission and reception route.

FIG. 5B is a functional block diagram of the packet switch. FIG. 5B illustrates general functions of the packet switch 100. The packet switch 100 includes the input port 101, a tag interpretation unit 501, a statistical counter 102, the distribution unit 104, the statistical counter 106, the QoS unit 107, a statistical counter 502, and the output port 108.

The tag interpretation unit 501 interprets a frame tag (VLAN tag) of the input packet, and the statistical counter 102 performs statistical counting for the high-priority packets (MFH) and the low-priority packets (non-MFH). The QoS unit 107 includes the queues 121 and the gates 122 described above. The statistical counter 502 performs statistical counting on each packet output from the output port 108.

FIG. 6A is a timing chart for describing an example of input of packets having different periods. FIG. 6A illustrates a state in which an MFH packet A (with a period of 1 msec), an MFH packet B (with a period of 2 msec), and an MFH packet C (with a period of 4 msec), which have high priority, are input to the packet switch 100.

Figure 6B:
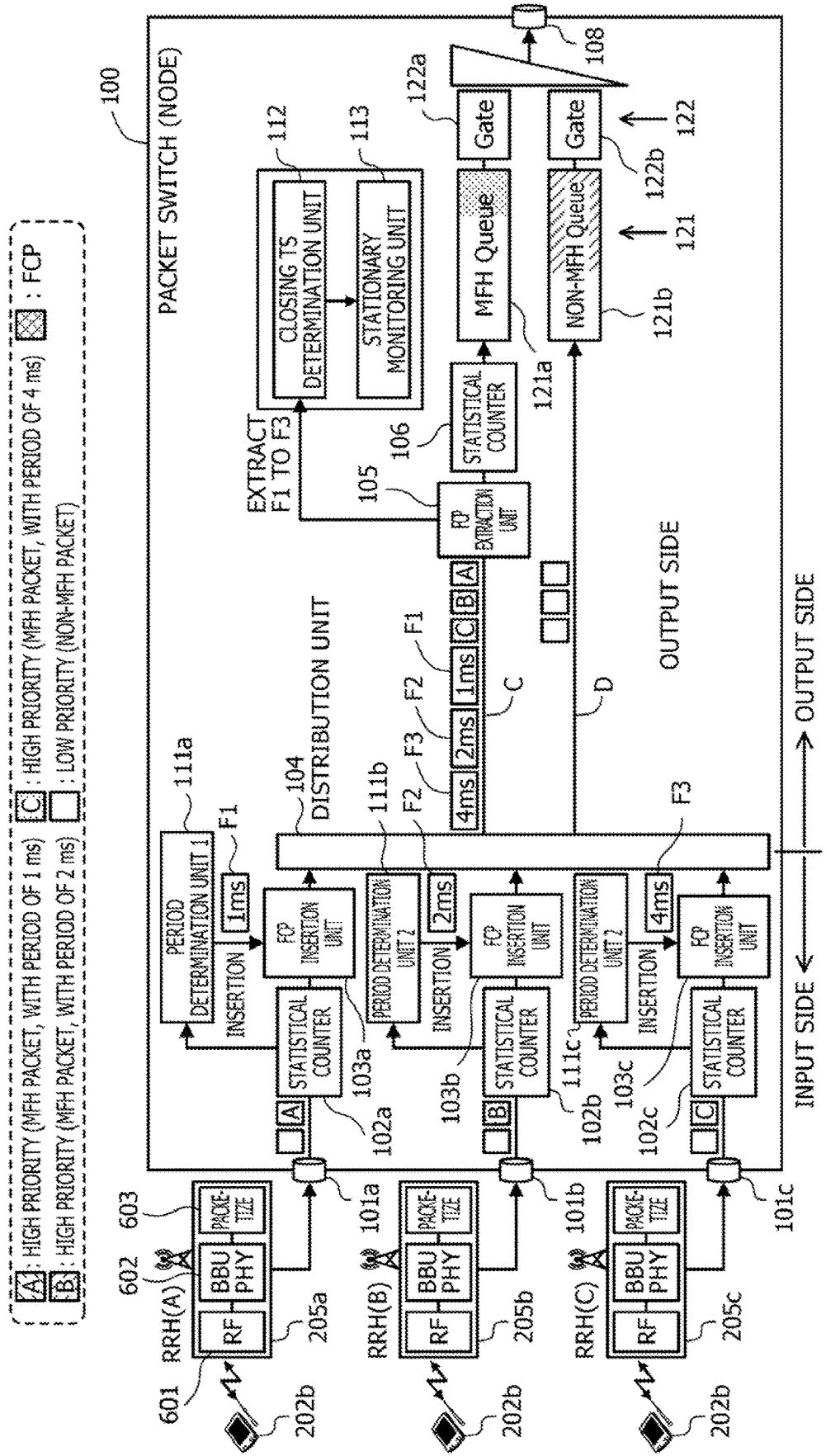
FIG. 6B is a diagram for describing a data flow inside a packet switch corresponding to FIG. 6A.

FIG. 6B is a diagram for describing a data flow inside the packet switch corresponding to FIG. 6A. It is assumed that the MFH packet A (with a period of 1 msec) is input to an input port 1 (101*a*), the MFH packet B (with a period of 2 msec) is input to an input port 2 (101*b*), and the MFH packet C (with a period of 4 msec) is input to an input port 3 (101*c*). In addition, the low-priority non-MFH packets are input to each of the input port 1 (101*a*) to the input port 3 (101*c*).

An RRH (A) 205*a* to an RRH (C) 205*c* respectively have RF units 205*a* to 205*c* that perform wireless communication with radio terminals 202*b*, and have a physical layer PHY (physical layer) unit 602 that performs data communication with the packet switch 100. The RRH (A) 205*a* to the RRH (C) 205*c* also have a pkt unit 603 that packetizes transmission and reception data of the radio terminal 202*b*.

The MFH packet A (with a period of 1 msec) output by the RRH (A) 205*a* is input to the input port 1 (101*a*). The MFH packet B (with a period of 2 msec) output by the RRH (B) 205*b* is input to the input port 2 (101*b*). The MFH packet C (with a period of 4 msec) output by the RRH (C) 205*a* is input to the input port 3 (101*c*).

A period determination unit 1 (111*a*) performs period determination for the MFH packet A input to the input port 1 (101*a*) based on the output of a statistical counter 102*a*. The period determination unit 111*a* inserts the determined period information of 1 msec as an FCP F1 by an FCP insertion unit 103*a*. A period determination unit 2 (111*b*) performs period determination for the MFH packet B input to the input port 2 (101*b*) based on the output of a statistical counter 102*b*. The period determination unit 111*b* inserts the determined period information of 2 msec as an FCP F2 by an FCP insertion unit 103*b*. The period determination unit 3 (111*c*) performs period determination for the MFH packet C input to the input port 3 (101*c*) based on the output of a statistical counter 102*c*. The period determination unit 111*c* inserts the determined period information of 4 msec as an FCP F3 by an FCP insertion unit 103*c*.

As described above, the corresponding period determination units 1 (111*a*) to 3 (111*c*) are arranged respectively for the input ports 101*a* to 101*c*. MFH packets with a single period are input to one input port 101. Thus, the period determination units 111 (111*a* to 111*c*) do not have to perform highly accurate period determination processing, and may easily and simply perform period determination. For example, the period determination unit 111 may easily and accurately perform the period determination by using the a. burst edge method described above.

A distribution unit 104 distributes output paths according to the priority for the packets respectively input from the plurality of input ports 1 (101*a*) to 3 (101*c*). In the example of FIG. 6B, the high-priority MFH packets A to C are output to a transmission path C side, and the low-priority MFH packets are output to a transmission path D side. The distribution unit 104 outputs all the FCPs F1 to F3 to the transmission path C side.

An FCP extraction unit 105 extracts the FCPs F1 to F3 from among the MFH packets A to C and the FCPs F1 to F3 flowing over the transmission path C, and outputs the FCPs F1 to F3 to a closing TS determination unit 112.

The MFH packets A to C and the FCPs over the transmission path C are stored in a queue 121*a* of the MFH, and the non-MFH packets over the transmission path D are stored in a queue 121*b* of the non-MFH.

The FCP extraction unit 105 extracts the FCPs F1 to F3 flowing over the transmission path C. The control unit 110 (closing TS determination unit 112) determines a closing TS based on the period information included in the FCPs F1 to F3. At the time of stationary monitoring during operation, the stationary monitoring unit 113 executes an opening and closing operation of the gates 122 (122*a* and 122*b*) based on the closing TS.

FIG. 6C is a timing chart for describing period determination of the packet switch corresponding to FIG. 6A. As illustrated in (a) of FIG. 6C, the period determination unit 1 (101*a*) determines that the MFH packet A has a period of 1 msec. The period determination unit 2 (101*b*) determines that the MFH packet B has a period of 2 msec. The period determination unit 3 (101*c*) determines that the MFH packet C has a period of 4 msec. Each of the period determination units 1 (111*a*) to 3 (111*c*) provided in the packet switch 100 may easily detect the period of each of the MFH packets A to C by performing the period determination only once.

Information on the periods determined by the period determination units 1 (101*a*) to 3 (101*c*) is input to the closing TS determination unit 112 using the FCPs F1 to F3. The closing TS determination unit 112 obtains the least common multiple of the periods of the MFH packets A to C indicated by the FCPs F1 to F3, respectively. In this case, since the MFH packet A has a period of 1 msec, the MFH packet B has a period of 2 msec, and the MFH packet C has a period of 4 msec, the closing TS determination unit 112 determines 4 msec, which is the least common multiple of 1, 2, and 4 (msec). The value 4 msec determined by the closing TS determination unit 112 is set as the period of the GCL 300.

FIG. 7 is an explanatory diagram using the least common multiple for determining a period of the closing TS. The control unit 110 (closing TS determination unit 112) determines the period of the closing TS, for example, the period of the GCL 300 by using the least common multiple of the periods of the plurality of MFH packets A to C determined by the period determination unit 111.

(a) of FIG. 7 illustrates the periods 1, 2, and 4 msec of each of the plurality of MFH packets A to C determined by the period determination unit 111, and a mixed state (equivalent to the packets flowing over the transmission line C) of the periods of the plurality of MFH packets A to C.

(b) of FIG. 7 illustrates a case where the closing TS determination unit 112 determines the period of the closing TS for each of the plurality of MFH packets A to C in the periods of 1, 2, and 4 msec. For example, in a case where the period of the closing TS is determined to be a period of 1 msec, gate control (opening of the gate 122*a* and closing of the gate 122*b*) by the GCL 300 is performed every 1 msec. In this case, as may be seen from a comparison with the packets in the mixed state in (a) of FIG. 7, the gate control is performed in each period of X1 to X6 in the drawing, for example, even during a period in which a packet is not actually transmitted.

Similarly, in a case where the period of the closing TS is determined to be a period of 2 msec, the gate control by the GCL 300 is performed every 2 msec. In this case, the gate control is performed in each period of Y1 and Y2 in the drawing, for example, even during a period in which a packet is not actually transmitted.

In a case where the period of the closing TS is determined to be a period of 4 msec, the gate control by the GCL 300 is performed every 4 msec. In this case, gate control may be performed in consideration of a period in which a packet is not actually transmitted in the drawing.

In this manner, by selecting the least common multiple to determine the closing TS, gate control suitable for the timing at which the MFH packet exists may be performed, and unnecessary gate control (opening of the gate 122*a*) at the timing at which the MFH packet does not exist may be suppressed. This may suppress unnecessary gate control (closing of the gate 122*b*) for the non-MFH packet, unnecessary band reduction, and network efficiency degradation.

Figure 8:
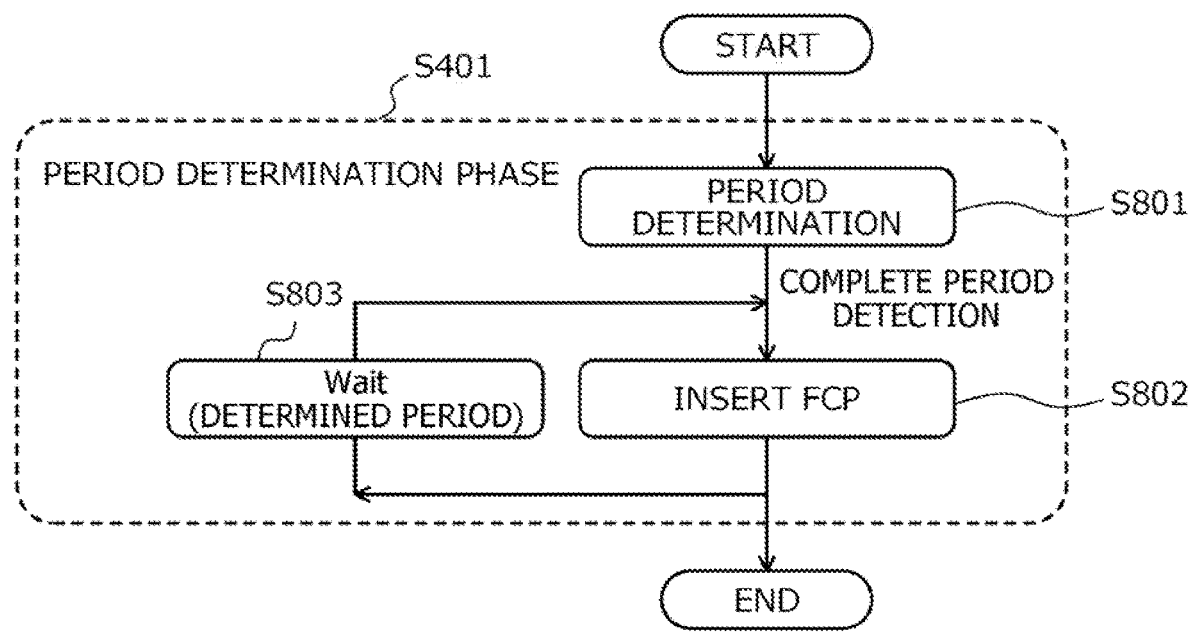
FIG. 8 is a flowchart illustrating a processing example of a period determination unit.

FIG. 8 is a flowchart illustrating a processing example of the period determination unit. FIG. 8 illustrates a processing example of a period determination phase (step S401 in FIG. 4) executed by the period determination unit 111 by the control unit (CPU 110).

The control unit 110 performs period determination of the input MFH packet (step S801). As described above, in the packet switch 100, the period determination units 111 are arranged for the respective input ports 101. Therefore, the control unit 110 (each period determination unit 111) may perform the period determination of the MFH packets of a single period, and may easily perform the period determination by, for example, the a. burst edge method described above.

Next, the control unit 110 inserts the determined period of the MFH packet as the FCP by the FCP insertion unit 103 (step S802) The FCPs (F1 to F3 described above) are distributed over the transmission path C by the distribution unit 104, extracted by the FCP extraction unit 105, and input to the closing TS determination unit 112.

The control unit 110 waits for a determined period in step S801 (Wait) (step S803), and repeatedly executes step S802 (FCP insertion) for each determined period.

Figure 9:
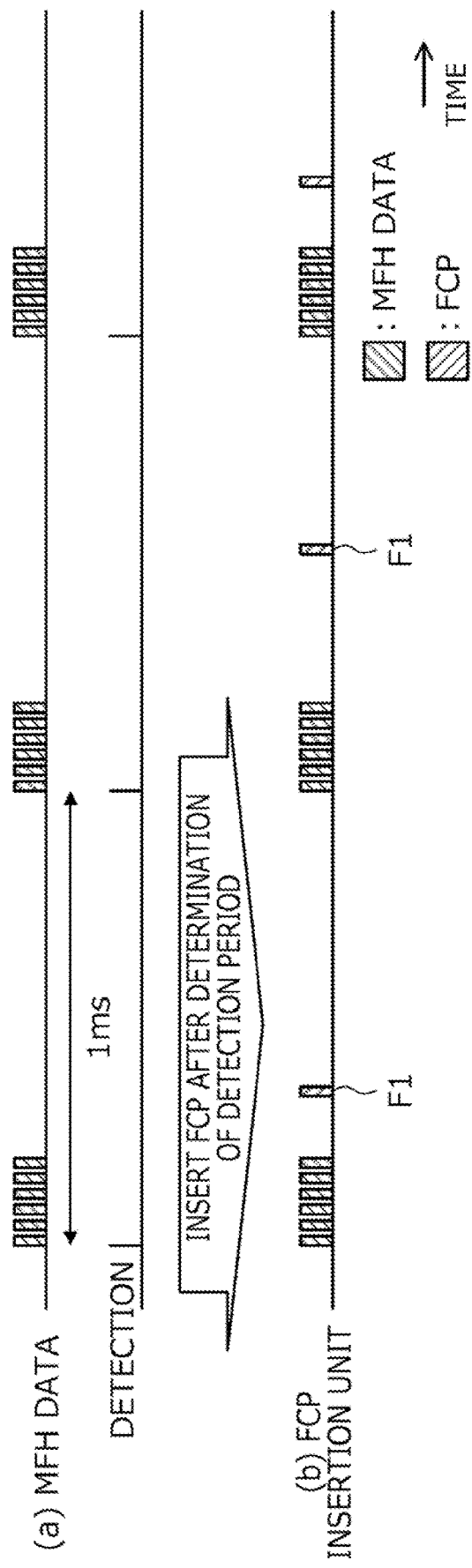
FIG. 9 is a timing chart illustrating an example of a timing for inserting an FCP.

FIG. 9 is a timing chart illustrating an example of a timing for inserting the FCP. In the drawing, the horizontal axis represents time. After the control unit 110 (period determination unit 111) determines the period of the MFH packet, the FCP insertion unit 103 repeats periodically inserting the FCP into a predetermined frame (step S802 to step S803 in FIG. 8).

For example, it is assumed that the MFH packet has a period of 1 msec as illustrated in (a) of FIG. 9. In this case, as illustrated in (b) of FIG. 9, the FCP insertion unit 103 inserts one FCP (for example, F1) within the determined period (1 msec) of the MFH packet.

The timing of the FCP insertion does not have to be strictly synchronized with the MFH packet. When strict synchronization is to be performed, a processing load of the control unit 110 increases and a special additional circuit is demanded in the packet switch 100b. In this manner, the FCP insertion unit 103 may insert one FCP at any free timing within the period (1 msec) of the MFH packet determined by the control unit 110 (period determination unit 111).

Figure 10:
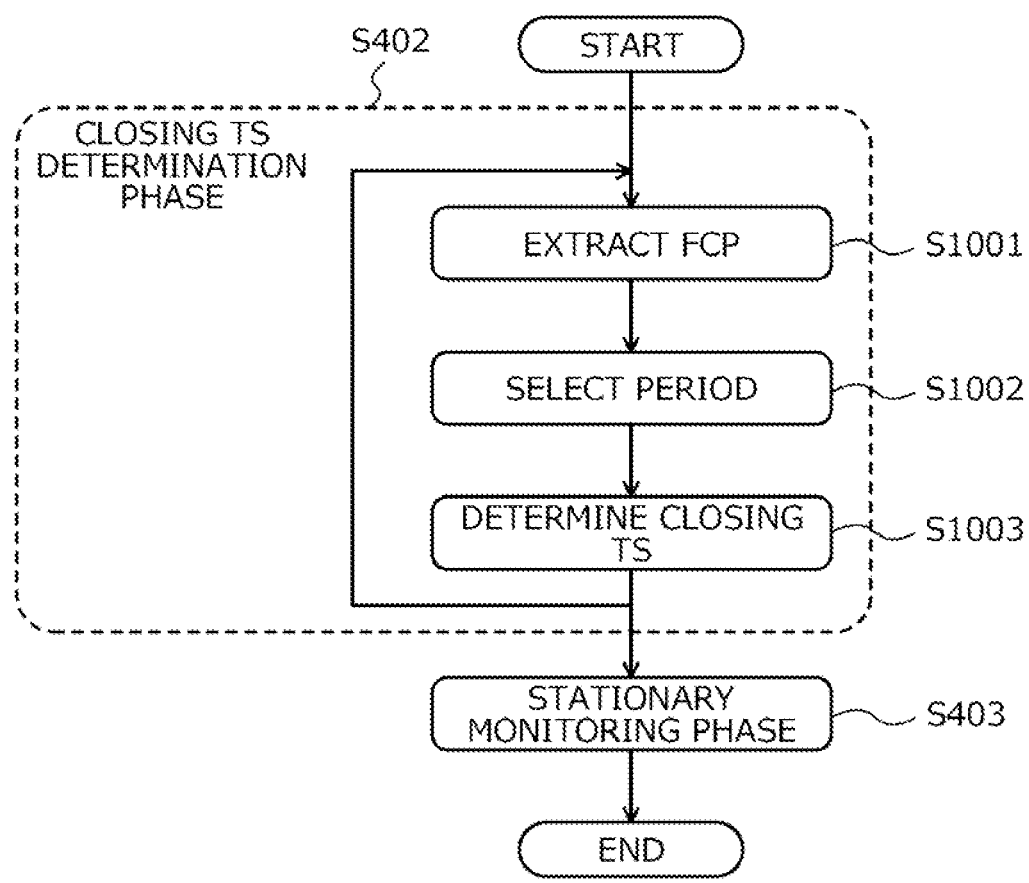
FIG. 10 is a flowchart illustrating a processing example of a closing TS determination unit.

FIG. 10 is a flowchart illustrating a processing example of the closing TS determination unit. FIG. 10 illustrates a processing example of the closing TS determination phase (step S402 in FIG. 4) executed by the closing TS determination unit 112 by the control unit (CPU 110).

The control unit 110 causes the FCP extraction unit 105 to extract the FCPs (F1 to F3) from the transmission path C (step S1001). Next, the control unit 110 selects a period of a plurality of MFH packets stored in the extracted FCP (extracts period information) (step S1002).

The control unit 110 determines a closing TS (Step S1003). For example, as described above, each period of 1, 2, and 4 msec determined by the period determination unit 111 for the MFH packets A to C is extracted, and the least common multiple (4 msec) of these periods is determined as the closing TS. The control unit 110 determines the determined period (4 msec) of the closing TS as the period of the GCI 300 (equivalent to step S301 in FIG. 3).

Thereafter, the control unit 110 proceeds to the stationary monitoring phase (step S403 in FIG. 4), and actually performs gate control on the gate 122 in the operation state.

Figure 11:
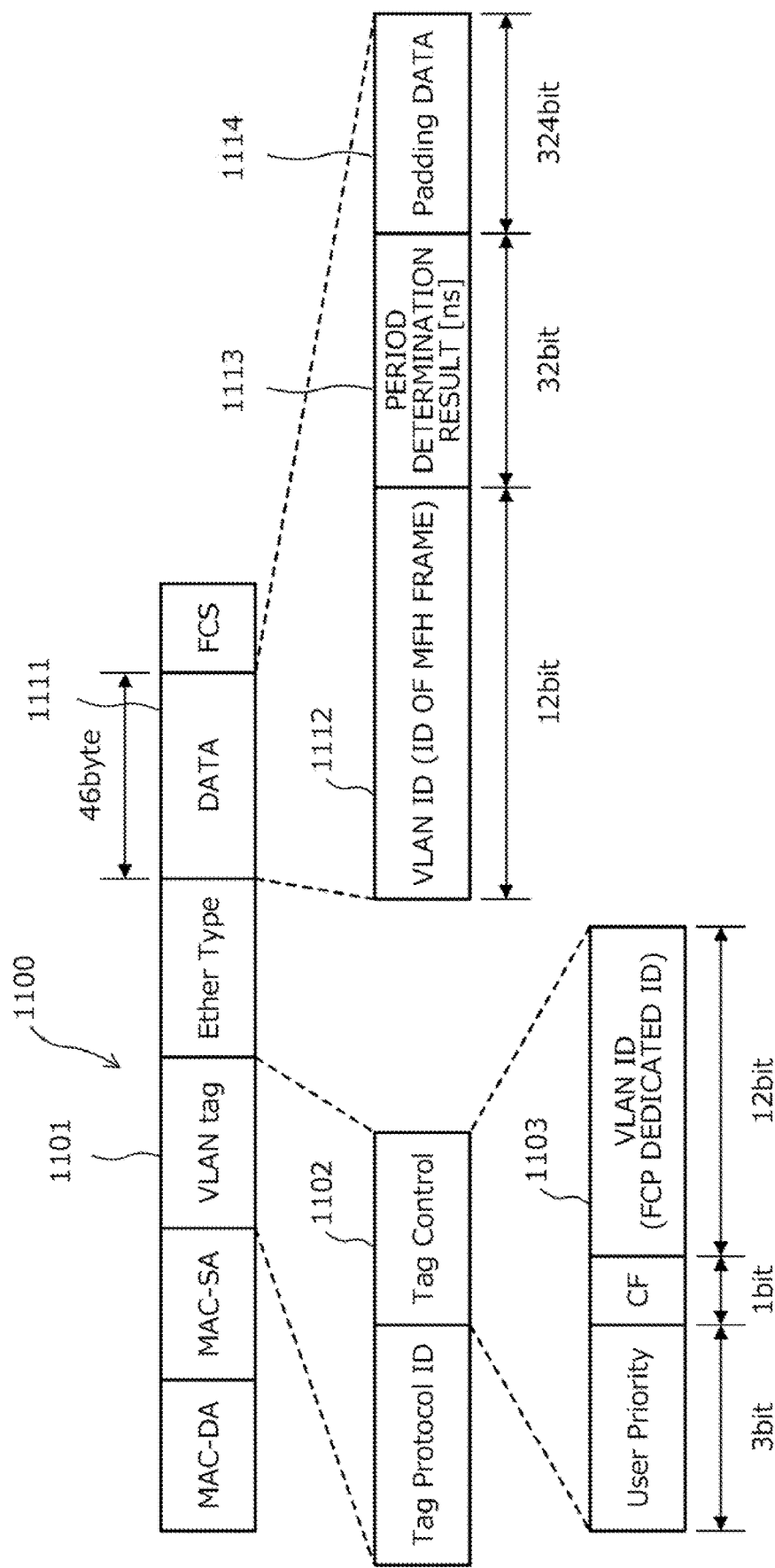
FIG. 11 is a diagram illustrating a format example of an FCP.

FIG. 11 is a diagram illustrating a format example of the FCP. A specific example of an FCP 1100 (F1 to F3 described above) used by the FCP insertion unit 103 will be described.

For example, as illustrated in FIG. 10, a general-purpose Ethernet frame may be used for the FCP 1100, and in this case, a specific VLAN ID 1103 may be used as an FCP dedicated ID.

The FCP insertion unit 103 copies a value of the MFH frame of which the period has been determined by the period determination unit 111, to each data field of MAC-DA, MAC-SA, Tag Protocol ID, User Priority, CF, and Ether Type. The FCP insertion unit 103 sets the FCP dedicated ID stipulated in a system in a VLAN ID 1103 (in a Tag Control 1102 in a VLAN tag 1101). For example, the value "4094" is fixedly set as the FCP dedicated ID.

The FCP insertion unit 103 stores, in a data field 1111, a VLAN ID 1112 (12 bits) of the MFH frame of which the period has been determined and a period determination result 1113 (32 bits: corresponding to up to a period of about 4 seconds in a unit of ns, in the example). The size of a shortage of 46 bytes in the data field is adjusted by padding data 1114.

The FCP 1100 is extracted by the FCP extraction unit 105. The FCP extraction unit 105 determines the FCP 1100 based on the value of the VLAN ID of the FCP 1100, for example, the value "4094". Then, the FCP extraction unit 105 extracts the period of the MFH packet based on the value of the data field of the VLAN ID 1112 and the period determination result 1113 of the determined FCP 1100. In this manner, as the FCP which is used in the packet switch 100, information on the determined period may be stored and used in a free area by using a general-purpose frame.

According to Embodiment 1 described above, the period of each of the plurality of MFH packets input to the packet switch 100 is determined. Accordingly, even when the MFH packets having a plurality of different periods are mixed over the packet switch 100, it is possible to determine the closing TS, for example, to appropriately set the period of the GCL 300. By arranging the period determination units 111 for the respective input ports 101, it becomes possible to determine the period of the MFH packets input in a single period per input port 101 with high accuracy in a short time. Thus, the packet switch 100 may maintain the low latency of the MFH packet.

Embodiment 1 is a configuration example of a single packet switch 100. In this case, it is desirable that the FCPs F1 to F3 generated in the packet switch 100 be deleted at the previous stage of the output of the output port 108. For example, by deleting the entire FCP 1100 illustrated in FIG. 11 or deleting the VLAN ID 1103 of the FCP 1100, it is possible to suppress the transmission of unnecessary packets to other network devices.

Embodiment 2

In Embodiment 1, the period determination in the single packet switch 100 has been described. In Embodiment 2, period determination by a plurality of packet switches 100 will be described. Also, in Embodiment 2, the configuration of the packet switch 100 is similar to that of Embodiment 1.

Figure 12:
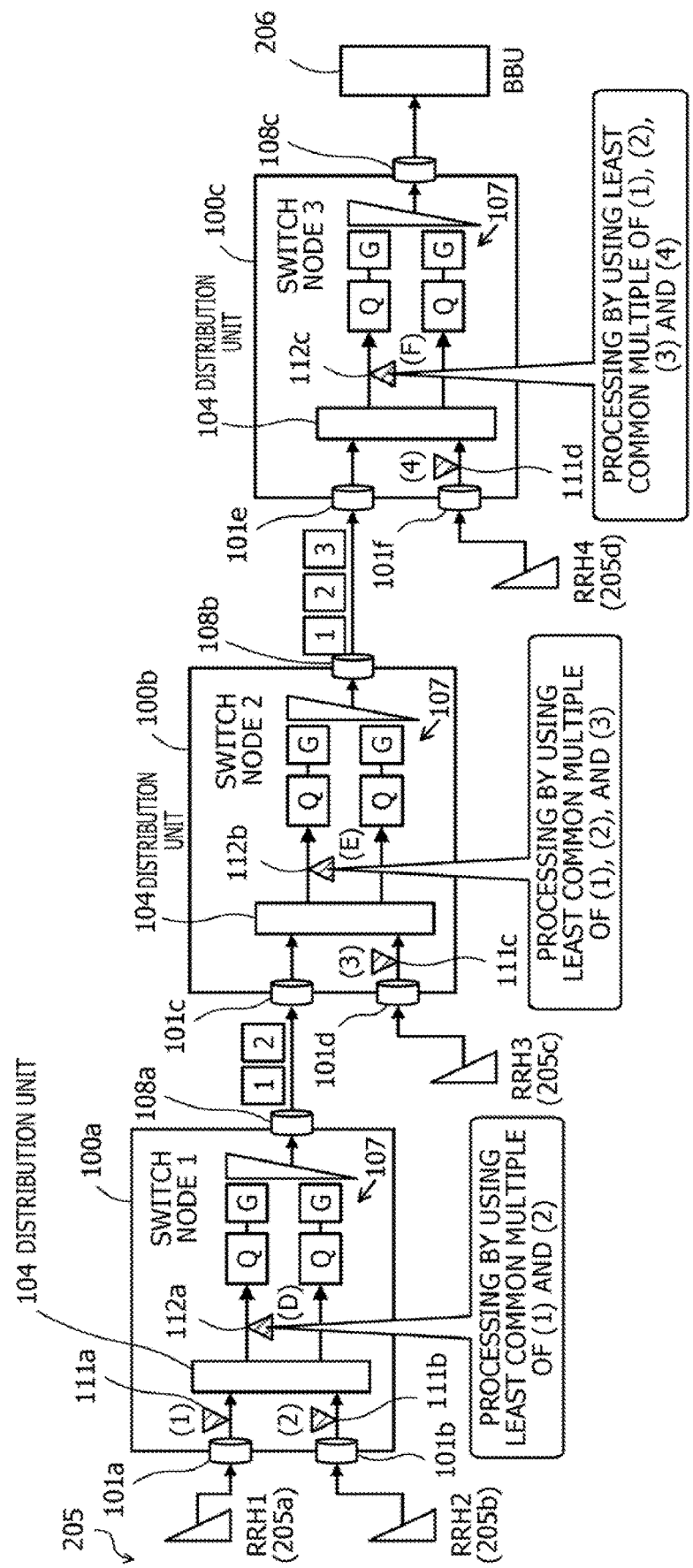
FIG. 12 is a diagram for describing period determination in a case where a plurality of packet switches according to Embodiment 2 are coupled to each other.

FIG. 12 is a diagram for describing period determination in a case where a plurality of packet switches according to Embodiment 2 are coupled. For example, in response to an increase in the number of RRHs 205, a plurality of packet switches 100 (100a to 100c) may be arranged as nodes 1 to 3 over a network (for example, the backbone line 207 in FIG. 2) and may be configured to be coupled in series.

In the example of FIG. 12, in the packet switch 100a of the node 1, an MFH packet (1) of an RRH1 (205a) is input to an input port 101a, and an MFH packet (2) of an RRH2

(205*b*) is input to an input port 101*b*. An output port 108*a* of the node 1 is coupled to an input port 101*c* of the packet switch 100*b* of the node 2.

An MFH packet (3) of an RRH3 (205*c*) is input to an input port 101*d* of the packet switch 100*b* of the node 2. An output port 108*b* of the node 2 is coupled to an input port 101*e* of the packet switch 100*c* of the node 3.

An MFH packet (4) of an RRH4 (205*d*) is input to an input port 101*f* of the packet switch 100*c* of the node 3. An output port 108*c* of the node 3 is coupled to a BRU 206.

As described above, even when the packet switch 100 is configured with the plurality of nodes 1 to 3, as described in Embodiment 1, the period determination is performed by the period determination units 111 arranged for of the respective input ports 101*a* to 101*f* directly coupled to the corresponding RRH1 to RRH4.

The packet switch 100*a* of the node 1 determines the MFH packet (1) of the RRH1 (205*a*) input to the input port 101*a* by a period determination unit 111*a*. A period determination unit 111*b* determines the MFH packet (2) of the RRH2 (205*b*) input to the input port 101*b*. A closing TS determination unit (D) 112*a* determines a closing TS by using the least common multiple of the periods of the MFH packets (1) and (2).

The packet switch 100*b* of the node 2 determines the MFH packet (3) of the RRH3 (205*c*) input to the input port 101*c* by a period determination unit 111*c*. A closing TS determination unit (E) 112*b* determines a closing TS by using the least common multiple of the periods of the input MFH packets (1) to (3).

The packet switch 100*c* of the node 3 determines the MFH packet (4) of the RRH4 (205*d*) input to the input port 101*f* by a period determination unit 111*d*. A closing TS determination unit (F) 112*c* determines the closing TS by using the least common multiple of the periods of the input MFH packets (1) to (4).

As described above, since the packet switches 100 (100*a* to 100*c*) arranged in each of the nodes 1 to 3 may determine the period of each of the MFH packets input in a single period by the period determination units 111 (111*a* to 111*d*), respectively, it is possible to perform the determination with simple processing. Each packet switch 100 (100*a* and 100*b*) may transfer the period determination result to the packet switches 100 (100*b* and 100*c*) in the subsequent stage using the FCPs ("1", "2", and "3").

The packet switches 100 (100*a* to 100*c*) of the respective nodes 1 to 3 each perform the processing of the closing TS determination unit 112 and the stationary monitoring unit 113 at each of points indicated by (D), (E), and (F). The closing TS determination unit 112 may determine the closing TS based on the FCPs ("1", "2", and "3") transferred from a node in the previous stage and the least common multiple of the determined period of the MFH packet input to the own node.

In the configuration example in which the plurality of packet switches 100 (100*a* to 100*c*) described in Embodiment 2 are coupled in series, it is desirable to delete the FCP 1100 at the output port 108*c* of the packet switch 100*c* arranged at the last stage of the packet switches coupled in series.

As described above, according to Embodiment 2, even when a plurality of packet switches are coupled, the configuration for period determination for each input port described in Embodiment 1 may be applied as it is. Thus, in Embodiment 2, as in Embodiment 1, it is possible to obtain an effect of easily and accurately determining a period in a short time. According to Embodiment 2, for example, an increase in the number of RRHs may be easily dealt with by increasing and installing packet switches.

Embodiment 3

In Embodiment 3, measures for system switching of a transmission system of a network will be described. In Embodiment 3, the configuration of the packet switch 100 is the same as that in Embodiment 1.

Figure 13:
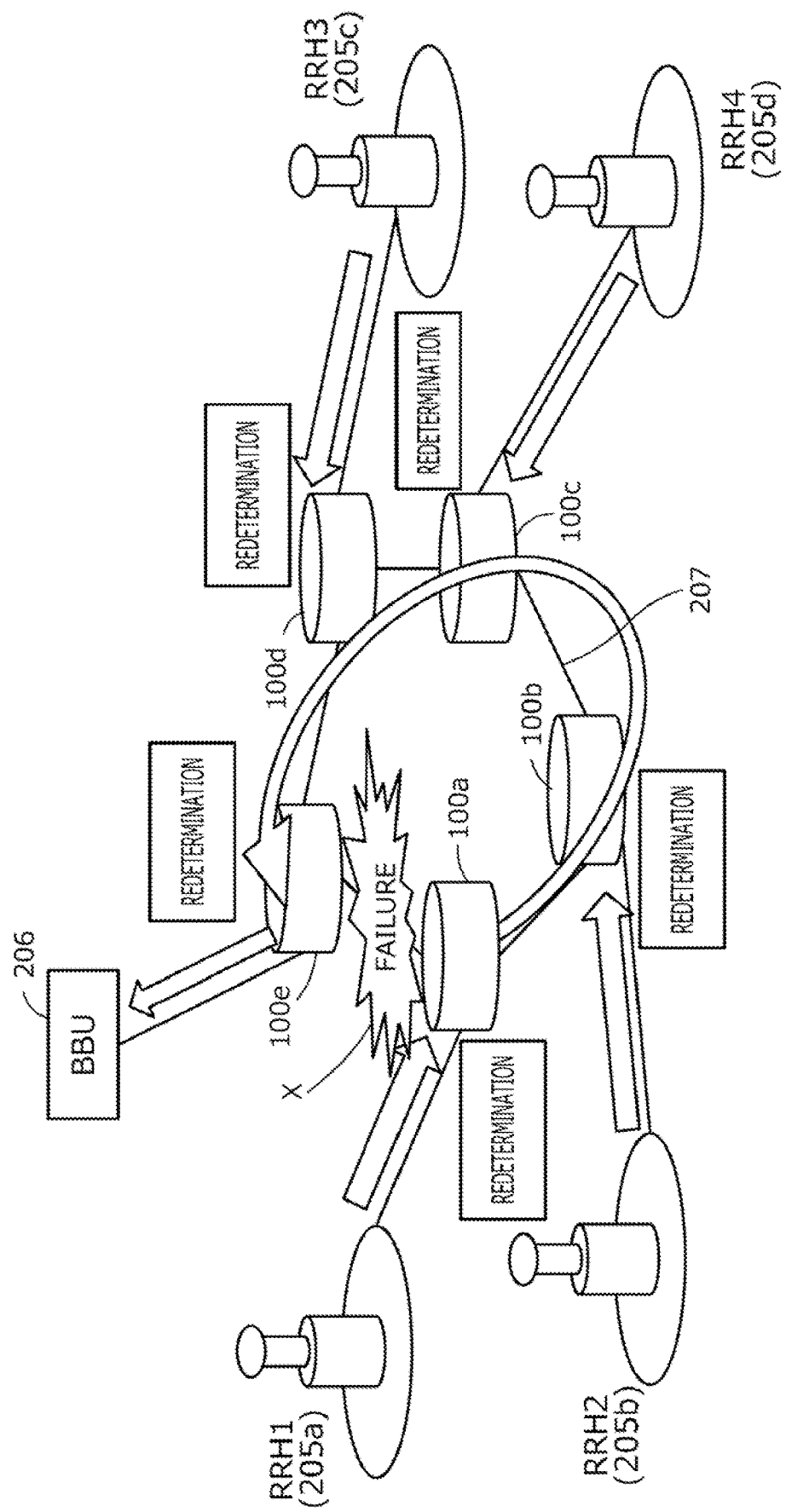
FIG. 13 is a diagram illustrating an example of occurrence of system switching over a network.

FIG. 13 is a diagram illustrating an example of occurrence of system switching on a network. For example, a plurality of packet switches 100 (100*a* to 100*e*) are arranged over a network (for example, the backbone line 207 in FIG. 2), and the MFH packets of an RRH1 (205*a*) to an RRH4 (205*d*) are input to the respective packet switches 100.

It is assumed that a failure occurs at a location X between the packet switches 100*a* and 100*e* over a ring network and the transmission passing through the location X is disabled. In this case, each of the packet switches 100 detects the system switching and switches to a transmission path (indicated by an arrow in the drawing) bypassing the location X where the failure occurs.

In the packet switch of the related art, the period determination units 111 in FIGS. 1 and 6B are arranged on the output side (subsequent stage from the distribution unit 104). When the system switching occurs in such a packet switch of the related art, a status on the output side (subsequent stage from the distribution unit 104) changes due to main signal joining from each of the RRH1 (205*a*) to RRH4 (205*d*). In this case, in the packet switch of the related art, it is demanded to stop the stationary monitoring phase in step S403 illustrated in FIG. 4, and execute the processing of the period determination phase in step S401 in the non-operation state and the closing TS determination phase in step S402 again. In this case, as a result of the increased time demanded to reconstruct low-latency processing, the packet switch may not satisfy low-latency demands.

In contrast, in the packet switch 100 described in Embodiment 1, the period determination for the input MFH packets is performed on the input side (previous stage from the distribution unit 104) directly coupled to the RRH1 to RRH4. Thus, since a main signal status does not change even when the system is switched, re-determination (re-execution of the processing illustrated in FIG. 8) in the period determination unit 111 at the time of the system switching is not demanded. This makes it possible to reduce the time demanded for low-latency reconstruction after system switching occurs. The time reduction is particularly remarkable at a node (packet switch 100) at a point where a plurality of frequencies (MFH packets) are joined.

Figure 14A:
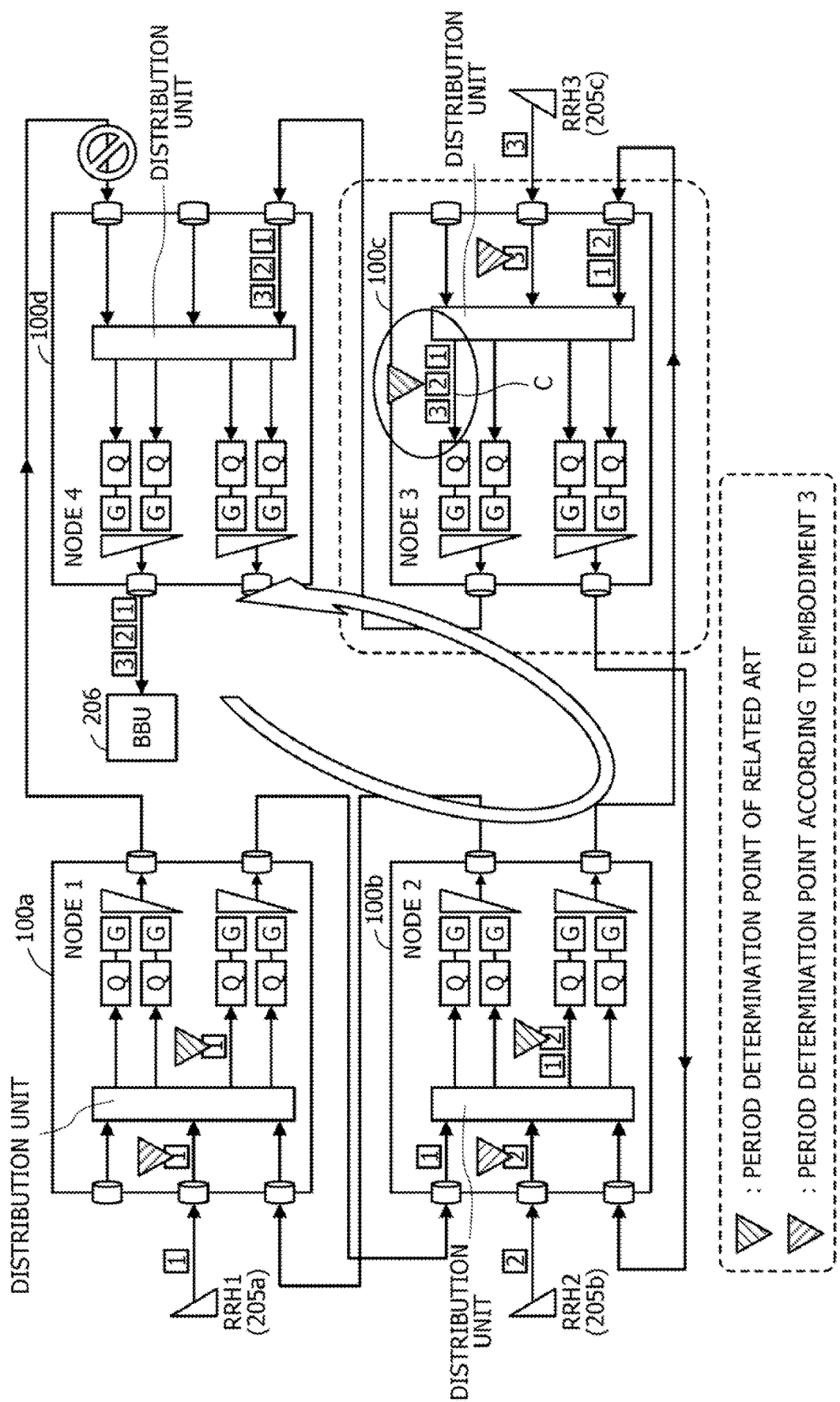
FIG. 14A is a diagram for describing a period determination state at the time of system switching according to Embodiment 3 (before system switching)
Figure 14B:
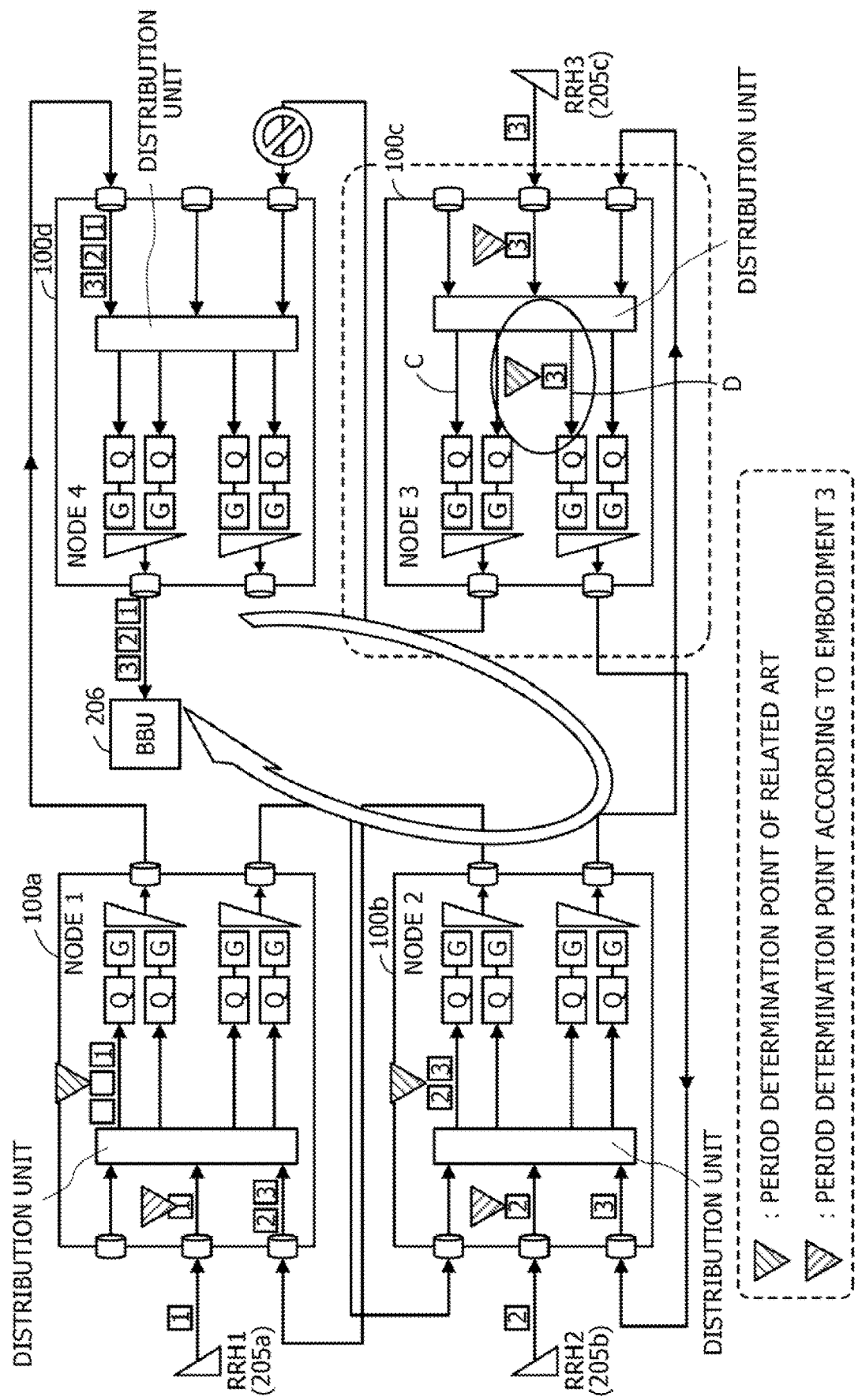
FIG. 14B is a diagram for describing a period determination state at the time of system switching according to Embodiment 3 (after system switching)

FIGS. 14A and 14B are diagrams for describing a period determination state at the time of system switching according to Embodiment 3. These drawings illustrate a configuration example of the ring network having four nodes (packet switches 100*a* to 100*d*).

FIG. 14A illustrates a state before the system switching. There is a counterclockwise transmission path from the node 1 (100*a*) of the RRH1 (205*a*) as a start point to the node 2 (100*b*), the node 3 (100*c*), the node 4 (100*d*), and the BBU 206. FIG. 14B illustrates a state after the system switching. There is a clockwise transmission path from the node 3 (100*c*) of the RRH3 (205*c*) as a start point to the node 2 (100*b*), the node 1 (100*a*), the node 4 (100*d*), and the BBU 206.

These drawings illustrate period determination points (arrangement positions of the period determination units 111) in the related art and Embodiment 3, respectively. The MFH packet of the RRH1 (205*a*) is indicated by "1", the MFH packet of the RRH2 (205*b*) is indicated by "2", and the MFH packet of the RRH3 (205*c*) is indicated by "3".

In a case of the related art, since both the period determination points and the mixed state of the MFH packets at the period determination points change before and after the system switching from FIG. 14A to FIG. 14B, the period determination is demanded again after the system switching. For example, when attention is paid to the node 3 (100*c*), the period determination point is changed from the transmission path C before the system switching (FIG. 14A) to the transmission path D after the system switching (FIG. 14B). The mixed state of the MFH frames at the period determination point of the node 3 (100*c*) is changed from a mixture of three types of "1", "2", and "3" before the system switching (FIG. 14A), to one type of "3" after the system switching (FIG. 14B).

In contrast, according to Embodiment 3, no change occurs in the period determination points and the MFH packets at the period determination points before and after the system switching from FIG. 14A to FIG. 148. Thus, even after the system is switched, the period determination at the period determination points (period determination unit 111) may not be performed again.

Figure 15:
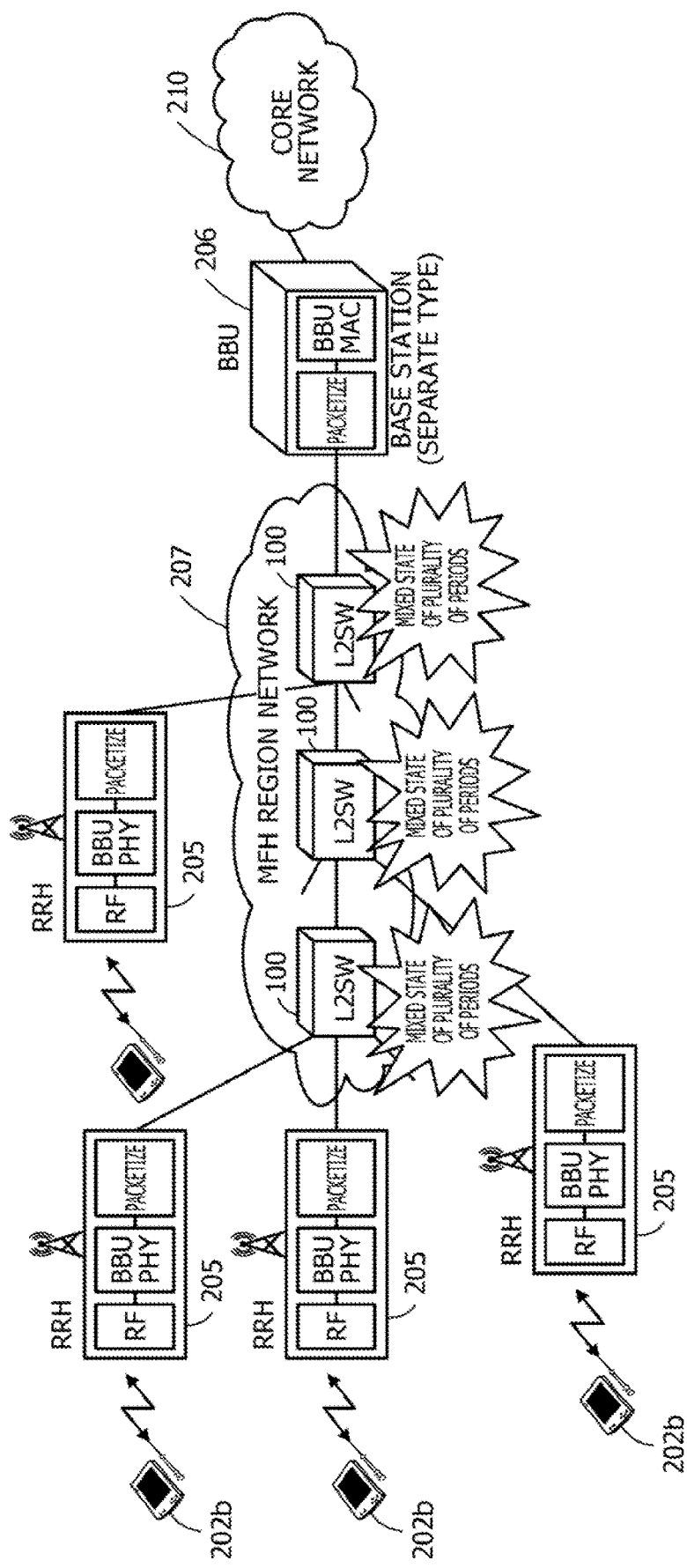
FIG. 15 is a diagram illustrating a mixed state of periods in a network area that handles MFH packets.

FIG. 15 is a diagram illustrating a mixed state of periods in a network area that handles the MFH packets. In an MFH area network (equivalent to the backbone line 207 in FIG. 2) that handles the MFH packets, a plurality of RRHs 205 for 5G communication are aggregated. Since the periods of the MFH packets are different for the respective RRHs 205, in the packet switch (L2 switch) 100 over the MFH area network 207, MFH packets having a plurality of different periods are mixed.

As described above, the packet switch 100 over the MFH area network 207 in which a plurality of MFH packets having different periods are mixed includes a period determination unit 111 for each input port 101 of the RRH 205 as described in each of Embodiments 1 to 3. Thus, the period determination unit 111 may easily and simply perform the period determination of the MFH packets input from the RRH 205. The closing TS determination unit 112 is notified of the period of the MFH packets in the subsequent stage of the distribution unit 104 by using the FCP, so that the closing TS determination unit 112 may determine an appropriate closing TS based on the MFH packets having a plurality of different periods and set the closing TS in the GCL 300.

The packet switch 100 described above determines, based on a determination result of a period of high-priority packets having periodicity, a time slot for closing the transmission of low-priority packets. The packet switch 100 includes a plurality of period determination units that are provided for respective input ports and respectively determine periods of input high-priority packets, and a closing TS determination unit that determines a setting period of a gate control list in which a time slot for closing is set, based on the periods of the plurality of high-priority packets respectively determined by the plurality of period determination units. The high-priority packets and the low-priority packets are input to the input ports, and the high-priority packets (MFH packets) input to one input port have a single period. Thus, the period determination unit may detect the period of the input high-priority packets (MFH packets) having a single period and the period determination may be easily and simply performed with predetermined accuracy without performing highly accurate period determination processing.

The packet switch 100 includes a distribution unit that distributes the input packets to different paths for the high-priority packets and the low-priority packets, and may be provided with a period determination unit and a control packet insertion unit at a previous stage of the distribution unit, and a control packet extraction unit at a subsequent stage of the distribution unit. The control packet insertion unit stores information on the period determined by the period determination unit in a control packet and transmits the control packet to the closing TS determination unit via the distribution unit, and the control packet extraction unit extracts the information on the period from the control packet having passed through the distribution unit and outputs the information on the period to the closing TS determination unit. Accordingly, the determination result in the period determination unit provided at the previous stage of the distribution unit may be output to the closing TS determination unit through the distribution unit.

In the packet switch 100, the closing TS determination unit may determine the least common multiple of the periods of the plurality of high-priority packets determined by the plurality of period determination units as the setting period. Thus, gate control suitable for the timing at which a high-priority packet exists may be performed, unnecessary gate control at the timing at which a high-priority packet does not exist may be suppressed, and unnecessary band reduction and network efficiency degradation may be suppressed.

In the packet switch 100, the period determination unit and the closing TS determination unit operate in a non-operation state of the device. The device includes a stationary monitoring unit that performs processing of a stationary monitoring phase for correcting information on a time slot for closing set in the gate control list, based on a monitoring state of an arriving high-priority packet by an operation after the device is shifted to an operation state. Among the processing of the period determination, the closing TS determination, and the stationary monitoring, the period determination is the most complex in processing logic and takes a long processing time. According to the embodiment, it is possible to perform period determination suitable for a plurality of high-priority packets while keeping the device in the non-operation state. Thus, for example, even when system switching of a transmission path occurs, a main signal status demanded for period determination does not change. Thus, re-determination in period determination may not be demanded at the time of system switching, and time demanded for low-latency reconstruction after system switching may be reduced. In the packet switch 100 where a plurality of high-priority packets are joined, an effect of time reduction may be particularly obtained.

The packet switch 100 may store and use information on the determined period in the free area of the general-purpose frame as a control packet. Accordingly, it is possible to notify the closing TS determination unit of a determination result determined by the period determination unit in the subsequent stage by using the general-purpose control packet.

The packet switch 100 may use a mobile front haul (MFH) packet as the high-priority packet. Thus, the packet switches 100 arranged in a network system that handles MFH packets such as 5G may autonomously perform gate control using a period suitable for the MFH packets.

In a configuration in which a plurality of packet switches are coupled, for the closing TS determination unit, the packet switch 100 determines a setting period in the own device based on the periods of the plurality of high-priority packets respectively determined by the period determination unit of a packet switch in the previous stage and the period determination unit in the own device. Accordingly, even in a case of a configuration in which a plurality of packet switches are coupled, the closing TS determination unit may also determine the setting period based on the periods of the plurality of input high-priority packets, without changing the configuration of the period determination unit. For example, in 5G network, since the period of the MFH packets differs for each RRH, in the packet switch 100 over the MFH area network, MFH packets having a plurality of different periods are mixed. Also, in this case, the period determination unit may easily and simply determine the period of the MFH packets input from the RRHs, and the closing TS determination unit may determine a setting period of an appropriate closing TS based on the MFH packets having a plurality of different periods.

In a case of a configuration in which one or a plurality of packet switches 100 are coupled, a control packet is deleted at an output port of the packet switch 100 in the last stage. This may suppress output of an unnecessary control packet to the outside, for example, the BBU.

In a control packet insertion process, the packet switch 100 may insert a control packet within the determined period of the high-priority packet. Since the timing of the insertion of the control packet does not have to be strictly synchronized with the high-priority packet, an increase in processing load may be suppressed, and a special additional circuit may not be demanded.

The packet switch 100 according to the embodiment performs processing of period determination, closing TS determination, and stationary monitoring, and performs gate control for closing a gate of a low-priority packet at an arrival timing of a high-priority packet. Among the processing, the period determination is the most complex in processing logic and takes a long processing time, but according to the embodiment, the period determination may be easily and simply performed with predetermined accuracy. This allows the packet switch 100 to maintain the requested low latency of the MFH packet even in a status in which high-priority packets having a plurality of different periods are mixed.

The packet period determination method described in the present embodiment may be implemented by a computer such as a CPU executing a program prepared in advance. The program described in the present embodiment is recorded on a readable recording medium and is executed by being read from the recording medium by the computer. The program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet switch that determines a time slot for closing transmission of low-priority packets based on a determination result of periods of high-priority packets having periodicity, the packet switch comprising:
    a memory; and
    a processor coupled to the memory and configured to:
        determine, for respective input ports, the periods of the high-priority packets of input packets from the respective input ports using a counter coupled to the respective input ports and provided in a transmission path;
        insert control packets including the periods of the high-priority packets into the transmission path;
        distribute the high-priority packets of the input packets and the control packet to a first path and the low-priority packets of the input packets to a second path;
        extract the control packets from the first path;
        determine a least common multiple of the periods of the extracted control packets as a setting period of a gate in which the time slot for closing the transmission of the low-priority packets is set;
        store the high-priority packets of the input packets and the control packet in a first memory provided in the first path and the low-priority packets of the input packets in a second memory provided in the second path; and
        control a first gate provided in the first path and a second gate provided in the second path based on the setting period.

2. The packet switch according to claim 1, wherein the processor operates in a non-operation state of a device, and performs processing of a stationary monitoring phase in which information on the time slot for closing the transmission of the low-priority packets set in a gate control list including the first gate and the second gate is corrected, based on a monitoring state of the arriving high-priority packets by an operation after the device is shifted to an operation state.

3. The packet switch according to claim 1, wherein, as the control packet, information on the determined periods is stored in a free area of a general-purpose frame.

4. The packet switch according to claim 1, wherein the high-priority packet is a mobile front haul (MFH) packet.

5. The packet switch according to claim 1, wherein, in a configuration in which a plurality of packet switches are coupled, the processor determines the setting period in the own device.

6. The packet switch according to claim 1, wherein, in a case of a configuration in which one or a plurality of packet switches are coupled, the control packet is deleted at an output port of a last stage.

7. A packet period determination method for determining a time slot for closing transmission of low-priority packets, based on a determination result of periods of high-priority packets having periodicity, the method comprising:
    determining each of the periods of the input high-priority packets of input packets from respective input ports using a counter coupled to the respective input ports and provided in a transmission path for the respective input ports;
    inserting control packets including the periods of the high-priority packets into the transmission path;
    distributing the high-priority packets of the input packets and the control packet to a first path and the low-priority packets of the input packets to a second path;
    extracting the control packets from the first path;
    determining a least common multiple of the periods of the extracted control packets as a setting period of a gate in which the time slot for closing the transmission of the low-priority packets is set;
    storing the high-priority packets of the input packets and the control packet in a first memory provided in the first path and the low-priority packets of the input packets in a second memory provided in the second path; and controlling a first gate provided in the first path and a second gate provided in the second path based on the setting period.

8. The packet period determination method according to claim 7, wherein the control packet is inserted within the periods of the high-priority packets.

\* \* \* \* \*